United States Patent
Azuma et al.

(10) Patent No.: US 7,035,411 B2
(45) Date of Patent: Apr. 25, 2006

(54) ENCRYPTION METHOD AND APPARATUS ENCRYPTING AND ADDING SIGNATURE INFORMATION TO QUBITS

(75) Inventors: Hiroo Azuma, Headington (GB); Masashi Ban, Saitama (JP)

(73) Assignees: Canon Kabushiki Kaisha, Tokyo (JP); Hitachi, Ltd., Tokyo (JP)

( * ) Notice: Subject to any disclaimer, the term of this patent is extended or adjusted under 35 U.S.C. 154(b) by 980 days.

(21) Appl. No.: 09/878,218

(22) Filed: Jun. 12, 2001

(65) Prior Publication Data
US 2002/0106084 A1    Aug. 8, 2002

(30) Foreign Application Priority Data
Jun. 12, 2000   (JP)   .............................. 2000-175762

(51) Int. Cl.
*H04K 1/00*  (2006.01)
*H04L 9/00*  (2006.01)

(52) U.S. Cl. .................. 380/256; 380/260; 380/263; 380/277

(58) Field of Classification Search ................ 380/256, 380/260, 277, 255, 263
See application file for complete search history.

(56) References Cited

U.S. PATENT DOCUMENTS

| | | | | |
|---|---|---|---|---|
| 5,400,027 | A * | 3/1995 | Moyal | 341/144 |
| 5,953,421 | A * | 9/1999 | Townsend | 380/283 |
| 6,529,601 | B1 * | 3/2003 | Townsend | 380/256 |
| 6,748,083 | B1 * | 6/2004 | Hughes et al. | 380/278 |
| 6,778,669 | B1 * | 8/2004 | Lehureau | 380/256 |
| 6,816,968 | B1 * | 11/2004 | Walmsley | 713/168 |

OTHER PUBLICATIONS

"Algorithms for Quantum Computation: Discrete Logarithms and Factoring", Peter Shor, Proceedings of the 35th Annual Symposium on Foundations of Computer Science, IEEE Computer Society Press, pp. 124-134, Santa Fe, Mexico, Nov. 1994.

"Polynomial Time Algorithms for Prime Factorization and Discrete Logarithms on a Quantum Computer", Peter Shor, SIAM J. Computing 26, 1483, vol. 26, No. 5, pp 1484-1509, Oct. 1997.

"Quantum Cryptography", Charles Bennett, et al., Scientific American, 267, No. 4, pp 50-57, Oct. 1992.

"Teleporting an Unknown Quantum State Via Dual Classical and Einstein-Podolsky-Rosen Channels", Charles Bennett, et al., Physical Review Letters, The American Physical Society, vol. 70, No. 13, pp 1895-1899, 0Mar. 23, 1993.

(Continued)

*Primary Examiner*—Ayaz Sheikh
*Assistant Examiner*—Pramila Parthasarathy
(74) *Attorney, Agent, or Firm*—Fitzpatrick, Cella, Harper & Scinto

(57) ABSTRACT

Arbitrary quantum information is input. The information of a quantum two-state system is acquired as a qubit by performing a computation in consideration of a physical system. The acquired qubit is encrypted. A quantum system having signature information for guaranteeing that the qubit is really transferred from a sender to a recipient is added to the encrypted qubit. The qubit to which the quantum system having the signature information is added is further encrypted. In this manner, an arbitrary quantum state can be encrypted and transmitted without letting the sender and recipient share an entangled pair of qubits in advance.

20 Claims, 10 Drawing Sheets

OTHER PUBLICATIONS

"Experimental Quantum Teleportation", D. Bouwmeester, et al., Nature, International Weekly Journal of Science, vol. 390, pp 575-579, Dec. 11, 1997.

"Unconditional Quantum Teleportation", A. Furusawa, et al., Science, vol. 282, No. 5389, pp 706-709, Oct. 23, 1998.

"Quantum Cryptography Based on Bell's Theorem"m Artur Ekert, Physical Review Letters, The American Physical Society, vol. 67, No. 6, pp. 661-663, Aug. 5, 1991.

"Quantum Crytography Without Bell's Theorem", Charles Bennett, Physical Review Letter, The American Physical Society, vol. 68, No. 5, pp 557-559, Feb. 3, 1992.

Purification of Noisy Entanglement and Faithful Teleportation Via Noisy Channels, Charles Bennett, et al., Physical Review Letters, The American Physical Society, vol. 76, No. 5, pp 722-725, Jan. 29, 1996.

"Quantum Privacy Amplification and the Security of Quantum Cryptography Over Noisy Channels", David Deutsch, et al., Physical Review Letters, The American Physical Society, vol. 77, No. 13, pp 2818-2821, Sep. 23, 1996.

"Mixed Entanglement and Quantum Error Correction", Charles H. Bennett, et al., Physical Review A, The American Physical Society, vol. 54, No. 5, pp 3824-3851, Nov. 1996.

"A Single Quantum Cannot be Cloned", W.K. Wootters, et al., Nature, vol. 299, pp 802-803, Oct. 28, 1982.

"Communication Channels Secured from Eavesdropping Via Transmission of Photonic Bell States", Kaoru Shimizu, et al., Physical Review A, The American Physical Society, vol. 60, No. 1, pp 157-166, Jul. 1999.

"Sending Entanglement Through Noisy Quantum Channels", Benjamin Schumacher, Physical Review A, The American Physical Society, vol. 54, No. 4, pp 2614-2628, Oct. 1996.

"Simple Quantum Computer", Isaac Chuang, et al., Physical Review A, The American Physical Society, vol. 52, No. 5, pp 3489-3496, Nov. 1995.

"A Silicon-Based Nuclear Spin Quantum Computer", B. Kane, Nature, International Weekly Journal of Science, vol. 393, pp 133-137, May 14, 1998.

"Quantum Computations with Cold Trapped Ions", J.I. Cirac, et al., Physical Review Letters, The American Physical Society, vol. 74, No. 20, pp 4091-4098, May 15, 1995.

"Elementary Gates for Quantum Computation", Adriano Barenco, et al., Physical Review A, The American Physical Society, vol. 52, No. 5, pp 3457-3467, Nov. 1995.

"Stabilizer Codes and Quantum Error Correction", Daniel Gottesman, Thesis, California Institute of Technology, Pasadena, California, May 21, 1997.

"Measurement of Condition Phase Shifts for Quantum Logic", Q.A. Turchette, et al., Physical Review Letters, The American Physical Society, vol. 75, No. 25, pp 4710-4713, Dec. 18, 1995.

"Quantum Cryptogrqaphy: Public Key Distribution and Coin Tossing", C.H. Bennett, et al., Proceedings of IEEE International Conference on Computers, Systems and Signal Processing, Bangalore, India, pp 175-179, Dec. 1984.

"Rapid Solution of Problems by Quantum Computation", D. Deutsch, et al., Proceedings of the Royal Society of London, Series A, vol. 439, No. 1907, pp 553-558, Dec. 1992.

"Experimental Quantum Cryptography", Charles Bennett, Journal of Cryptology, International Association of Cryptologic Research, pp 3-29, 1992.

\* cited by examiner

QUANTUM CRYPTOGRAPHIC COMMUNICATIOON BETWEEN ALICE AND BOB $$|\Psi_{crypt}\rangle = V_\alpha^{QS}[|a\rangle_S \otimes U_i^Q|\Psi\rangle_Q]$$

SECOND ENCRYPTION PERFORMED BY ALICE $x_k, a_k \in \{0, 1\}$ $L_{k,1}^Q, L_{k,2}^S \in \{I, H, \sigma_x, H\sigma_x\}$

TYPICAL QUANTUM GATES

CONTROOLED-NOT GATE $i, j \in \{0, 1\}$

TYPICAL QUANTUM GATES

EAVESDROPPING STRATEGY TAKEN BY EVE

QUANTUM GATE NETWORK FOR PHOTON COUNTING

INTERCEPT / RESEND ATTACK MADE BY EVE AGAINST SYSTEM S $\forall L_1, L_2 \in \{I, H, \sigma_x, H\sigma_x\}, \qquad \forall a \in \{0, 1\}$

INTERCEPT / RESEND ATTACK MADE BY EVE AGAINST ONE QUBIT $|\phi\rangle_S = L_2 |0\rangle_S$
$L_2 \in \{ I, H, \sigma_x, H\sigma_x \}$

INTERCEPT / RESEND ATTACK MADE BY EVE AGAINST SYSTEMS S AND Q

QUANTUM GATE NETWORK FOR 2-QUBIT PERMUTATION

NETWORK WHICH MAKES QUANTUM INFORMATION QUBIT HAVE PARITY

PHOTON-COUNTING MEASUREMENT USING NONLINEAR DEVICES 50-50 BEAMSPLITTER

KERR-TYPE QUANTUM PHASE-GATE

ENCRYPTION METHOD AND APPARATUS ENCRYPTING AND ADDING SIGNATURE INFORMATION TO QUBITS

FIELD OF THE INVENTION

The present invention relates to an encryption method and apparatus for an arbitrary quantum state.

BACKGROUND OF THE INVENTION

Recent years have seen rapid advances in quantum information theory and quantum computation theory which perform unconventional information processing by effectively using the principles of quantum mechanics (P. W. Shor, "Algorithms for quantum computation: Discrete logarithms and factoring" in Proceedings of the 35th Annual Symposium on Foundations of Computer Science (ed. S. Goldwasser) 124–134 (IEEE Computer Society, Los Alamitos, Calif., 1994), P. W. Shor, "Polynomial-Time Algorithms for Prime Factorization and Discrete Logarithms on a Quantum Computer", SIAM J. Computing 26, 1483 (1997), and D. Deutsch and R. Jozsa, "Rapid solution of problems by quantum computation", Proc. R. Soc. Lond. A 349, 553 (1992)). Concurrently with these theories, studies have also been made to apply uncertainty of quantum theory, the quantum no-cloning theorem for pure quantum states, and entanglement between quantum systems to encryption. Of the methods studied, BB84 is considered as an effective key distribution method, which can implement highly safe encryption in combination with the one-time pad method (C. H. Bennett and G. Brassard, "Quantum cryptography: Public key distribution and coin tossing", Proceedings of IEEE International Conference on Computers, .Systems, and Signal Processing, Bangalore, India, pp. 175–179, December 1984, C. H. Bennett, F. B. Bessette, G. Brassard, L. Salvail and J. Smolin, "Experimental Quantum Cryptography", J. Cryptography, 5: 3–28 (1992), and C. H. Bennett, G. Brassard, and A. K. Ekert, "Quantum Cryptography", Scientific American, 267, No. 4, 50–57, October 1992). Quantum teleportation is considered as a method of effectively transmitting an arbitrary quantum state (C. H. Bennett, G. Brassard, C. Cépeau, R. Jozsa, A. Peres and W. K. Wootters, "Teleporting an unknown quantum state via dual classic and Einstein-Podolsky-Rosen channels", Phys. Rev. Lett. 70, 1895 (1993), D. Bouwmeester, J-W. Pan, K. Mattle, M. Eibl, H. Weinfurter and A. Zeilinger, "Experimental quantum teleportation", Nature 390, 575–579 (1997), and A. Furusawa, J. L. Sørensen, S. L. Braunstein, C. A. Fuchs, H. J. Kimble and E. S. Polzik, "Unconditional Quantum Teleportation", Science 282, 706–709 (1998)).

A sender of information, recipient, and eavesdropper will be referred to as Alice, Bob, and Eve, respectively, in accordance with the practices in the field of encryption.

BB84 is used to share a classical random string without making the third party know it. The sender Alice randomly selects one of four types of states, i.e., $\{|0>,|1>\}$ of a rectilinear basis and $\{(1/\sqrt{2})(|0>\pm|1>)\}$ of a circular basis as one photon (two-state system or qubit) state, and sends it to the recipient Bob. Bob randomly selects one of two types of bases independently of Alice, and observes the sent photon with the selected basis. This process is repeated, and data is adopted only when the bases selected by Alice and Bob match. In this case, $|0>,(1/\sqrt{2})(|0>+|1>)$ is made to correspond to the bit value "0", and $|1>,(1/\sqrt{2})(|0>-|1>)$ is made to correspond to "1".

The rectilinear basis and the circular basis are inconsistent with each other. The data obtained by observation with wrong bases become random probabilistically. Assume that the eavesdropper Eve extracts a photon on the way, observes it with some basis, and sends substitute photon. In this case, a contradiction arises with a probability of ¼ or more per photon. As a consequence, Alice and Bob notice eavesdropping. As described above, BB84 effectively uses the uncertainty principle of quantum mechanics to detect the presence of an eavesdropper.

A. K. Ekert has proposed a protocol for performing classical random key distribution by distributing two qubits of EPR-state $|\Psi^->=(1/\sqrt{2})(|01>-|10>)$ to Alice and Bob (A. K. Ekert, "Quantum Cryptography Based on Bell's Theorem", Phys. Rev. Lett. 67, 661 (1991)). The intervention of Eve is detected by the Bell's theorem. Each of Alice and Bob randomly selects one of three types of predetermined bases, and observes the EPR-state qubit on hand. This process is repeated, and the result obtained when bases match is adopted as data for a key. If observation is made with different bases, the result is disclosed through a public channel, and a correlation function S is calculated. Eavesdropping is detected on the basis of the difference between the correlation functions S with and without the intervention of Eve.

C. H. Bennett et al. have studied the protocol obtained by simplifying the protocol by A. K. Ekert, and showed that the protocol was equivalent to BB84 (C. H. Bennett, G. Brassard, and N. D. Mermin, "Quantum Cryptography without Bell's Theorem", Phys. Rev. Lett. 68, 557 (1992)). According to C. H. Bennett et al., each of Alice and Bob is made to select two types of observation bases, and Alice is made to have an EPR-state source. Alice leaves one of a pair of qubits generated by the EPR-state source on her side, makes observation with a basis randomly selected from the rectilinear basis and the circular basis, and sends the remaining qubit to Bob. The results obtained when the observation bases on the Alice and Bob sides match are adopted as data, and some of the data are used for detection of Eve. It is impossible to discern whether the randomness of signals transmitted from Alice to Bob is based on observation of EPR-state or a classical random number. That is, this technique is equivalent to BB84. Owing to these studies, it has been recognized that classical key distribution based on quantum mechanics can be satisfactorily performed by utilizing only uncertainty, and entanglement is not necessarily required. (It is, however, known that a combination of the technique called entanglement purification protocol and the protocol by Ekert makes it possible to execute highly safe classical key distribution (C. H. Bennett, G. Brassard, S. Popescu, B. Schumacher, J. A. Smolin, and W. K. Wootters, "Purification of Noisy Entanglement and Faithful Teleportation via Noisy Channels", Phys. Rev. Lett. 76, 722 (1996), D. Deutsch, A. Ekert, R. Jozsa, C. Macchiavello, S. Popescu and A. Sanpera, "Quantum Privacy Amplification and the Security of Quantum Cryptography over Noisy Channels", Phys. Rev. Lett. 77, 2818 (1996), C. H. Bennett, D. P. DiVincenzo, J. A. Smolin, and W. K. Wootters, "Mixed-state entanglement and quantum error correction", Phys. Rev. A54, 3824 (1996)).

Quantum teleportation is used to transmit an arbitrary quantum state. Assume that Alice and Bob share a pair of qubits in the EPR-state in advance. Alice observe a qubit in a state $|\Psi>$ to be transmitted and a qubit in the EPR-state on hand with four Bell states as a base. Alice notifies Bob of the observation result as 2-bit classical information through a public channel. Bob performs unitary transformation of the qubit in the EPR-state in accordance with this notification from Alice. As a result, the qubit held by Bob is set in the state |Ψ> which Alice wanted to transmit. This method is characterized in that the classical information of |Ψ> is completely separated from non-classical information, and only the classical information is sent through the public channel. From this reason, Alice need not know the accurate position of Bob. In addition, eavesdropping is theoretically impossible as long as the EPR-state is properly shared. Eve cannot even destroy the quantum information |Ψ>.

There is an intimate connection between these methods and the no-cloning theorem. This theorem states that there is no unitary transformation that clones an arbitrary quantum state (W. K. Wootters and W. H. Zurek, "A single quantum cannot be cloned", Nature 299, 802–803 (1982)). In BB84, this theorem is effective in the following point. Even if Eve intercepts a qubit (photon) midway along a quantum channel, she cannot discern which one of two types of bases is selected. Eve cannot therefore clone the qubit and leave the clone on hand. As a consequence, Eve must observe the qubit with some basis and send substitute qubit in accordance with the observation result. In this sense, the "no cloning theorem" may be considered as another expression of uncertainty. According to quantum teleportation, Alice cannot clone the state |Ψ> which she wants to transmit, and hence cannot observe |Ψ>. This is because, observation may disturb the original quantum information. In quantum teleportation, both Alice and Bob have no knowledge about the quantum state |Ψ> that is being transmitted throughout the process.

Recently, a method of safely transmitting classical binary data (not classical random string) by using two photons in the Bell state has been proposed (K. Shimizu and N. Imoto, "Communication channels secured from eavesdropping via transmission of photonic Bell states", Phys. Rev. A 60, 157 (1999)). According to the characteristic features of this method, each of Alice and Bob prepares two types of bases on $H_2^2$ and performs encoding and observation. In addition, encoding is performed by using only the degree of freedom corresponding to two dimensions out of four dimensions of the Hilbert space.

Quantum teleportation has excellent properties when it is used as a method of transmitting an arbitrary quantum state. However, a sender (Alice) and recipient (Bob) must share a pair of entangled qubits prior to operation for transmission. This pair of qubits are generated by a given source first, and then must be distributed to the sender (Alice) and recipient (Bob) via a quantum channel. If, therefore, an eavesdropper (Eve) intercepts the qubit to be held by the recipient (Bob) midway along a quantum channel, eavesdropping will become successful. To avoid such a danger, the sender (Alice) and recipient (Bob) distribute many pairs of entangled qubits to each other first, and then purify them by a technique called entanglement purification protocol (C. H. Bennett, G. Brassard, S. Popescu, B. Schumacher, J. A. Smolin, and W. K. Wootters, "Purification of Noisy Entanglement and Faithful Teleportation via Noisy Channels", Phys. Rev. Lett. 76, 722 (1996), D. Deutsch, A. Ekert, R. Jozsa, C. Macchiavello, S. Popescu and A. Sanpera, "Quantum Privacy Amplification and the Security of Quantum Cryptography over Noisy Channels", Phys. Rev. Lett. 77, 2818 (1996), and C. H. Bennett, D. P. DiVincenzo, J. A. Smolin, and W. K. Wootters, "Mixed-state entanglement and quantum error correction", Phys. Rev. A54, 3824 (1996)).

SUMMARY OF THE INVENTION

It is an object of the present invention to provide a method and apparatus for encrypting and transmitting an arbitrary quantum state without letting a sender and recipient share an entangled pair of qubits in advance.

According to one aspect of the present invention, there is provided an encryption method comprising:

the acquisition step of inputting arbitrary quantum information and acquiring information of a quantum two-state system as a qubit by performing a computation in consideration of a physical system;

the first encryption step of encrypting the qubit acquired in the acquisition step;

the adding step of adding to the encrypted qubit a quantum system having signature information for guaranteeing that the qubit is really transferred from a sender to a recipient; and the second encryption step of encrypting the quantum to which the quantum system having the signature information is added.

According to another aspect of the present invention, there is provided an encryption apparatus comprising: acquisition means for inputting arbitrary quantum information and acquiring information of a quantum two-state system as a qubit by performing a computation in consideration of a physical system;

first encryption means for encrypting the qubit acquired by said acquisition means;

adding means for adding to the qubit a quantum system having signature information for guaranteeing that the qubit is really transferred from a sender to a recipient; and second encryption means for encrypting the quantum to which the quantum system having the signature information is added.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
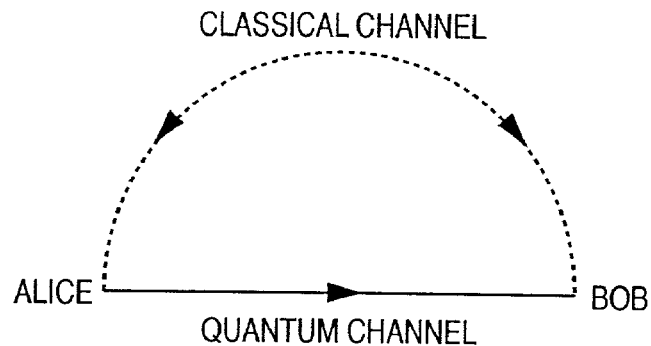
FIG. 1 is a view showing quantum cryptographic communication between Alice and Bob, which is used in the first embodiment.

Preferred embodiments of the present invention will now be described in detail in accordance with the accompanying drawings.

There are two important points in an encryption method proposed in this specification.

First, it is important to develop a technique of preventing an eavesdropper (Eve) from extracting original information even if she steals a quantum state. One operator randomly selected from a proper set $M=\{U_i\}$ of unitary operators is applied to an arbitrary n-qubit state $|\Psi\rangle$ to be sent. A subscript i of each operator is a password for decryption. Since the eavesdropper (Eve) dose not know which $U_i$ is selected, the encrypted state is a statistical mixture of states obtained by transforming $|\Psi\rangle$ with the operators of M. M is selected to make this statistically mixed state proportional to the identity operator. As will be described in [Quantum Encryption Protocol] in the first embodiment, according to this encryption protocol, the first password i is not disclosed before authentication is properly done between the sender and the recipient.

Second, it is important to perform authentication guaranteeing that a quantum state is reliably transferred from the sender to the recipient. Both the sender (Alice) and the recipient (Bob) have no knowledge about the n-qubit quantum state $|\Psi\rangle_Q$. If, therefore, the eavesdropper (Eve) replaces this state with another state, the sender and recipient do not notice it. From this reason, the recipient (Bob) must confirm that the received quantum state is really sent from the sender (Alice). According to the method discussed here, n-qubit $|a\rangle_S$ representing the signature of the sender (Alice) is added to $U_i^Q|\Psi\rangle_Q$ and $|a\rangle_S$ and $U_i^Q|\Psi\rangle_Q$ are entangled for each qubit. In this case, a system representing the quantum data is represented by Q, and a system representing the signature is represented by S. To prevent the eavesdropper (Eve) from cloning the information of each qubit, an operator randomly selected from $L=\{I, H, \sigma_x, H\sigma_x\}$ is applied to each qubit. Note that H represents Hadamard transformation, $|0\rangle \rightarrow (1/\sqrt{2})(|0\rangle+|1\rangle)$, $|1\rangle \rightarrow (1/\sqrt{2})(|0\rangle-|1\rangle)$, and $\sigma_x$ represents one of the Pauli matrices, $|0\rangle \rightarrow |1\rangle$, $|1\rangle \rightarrow |0\rangle$. The operator selected from L becomes the second password for decryption.

Passwords and signatures are provided with classical bit strings and exchanged between a sender and a recipient through a classical channel. An eavesdropper can also know such information.

According to the first important point described above, one operator randomly selected from the proper set $M=\{U_i\}$ of unitary operators is applied to the arbitrary n-qubit state $|\Psi\rangle$ to be sent. With this operation, the following effect can be obtained. As described above, since the eavesdropper does not know which $U_i$ is selected, the encrypted state becomes a statistically mixed state that is proportional to the identity operator I for the eavesdropper. From this reason, the eavesdropper (Eve) cannot extract any information about $|\Psi\rangle$ as long as she does not know the password i. This is because, $|\Psi\rangle$ cannot be extracted by addition of any auxiliary system, unitary transformation, and observation with respect to $\rho=(1/2^n)I$. To obtain the information of $|\Psi\rangle$, therefore, the eavesdropper (Eve) must use an eavesdropping method capable of proper authentication.

According to the second important point described above, n-qubit $|a\rangle_S$ representing the signature of a sender is added $U_i^Q|\Psi\rangle_Q$ to entangle each pair of qubits, and an operator randomly selected from $L=\{I, H, \sigma_x, H\sigma_x\}$ is applied to each qubit. With this operation, the following effect can be obtained. The information of each encrypted qubit is randomly expressed by one of two types of inconsistent bases (rectilinear basis or circular basis). If the eavesdropper (Eve) intervenes, a contradiction arises with a predetermined probability or more. This technique is essentially the same as the eavesdropping detection technique used in BB84. This allows the sender (Alice) and recipient (Bob) to detect the intervention of the eavesdropper (Eve). In this method, authentication operation also serves to detect the eavesdropper (Eve).

According to the encryption method described in the first embodiment, when quantum information to be transmitted includes n qubits in an arbitrary state and an eavesdropper observes each of m qubits out of these n qubits independently and resends substitute qubits (Intercept/Resend attack), the probability that a sender and recipient overlook the eavesdropper is suppressed to $(3/4)^m$. Assume that the state $|\Psi\rangle_Q$ to be transmitted is classical information, i.e., a product state $|\Psi\rangle_Q=|0\rangle|1\rangle\cdots|0\rangle$ with the bases $\{|0\rangle, |1\rangle\}$. In this case, encryption by the embodiment is equivalent to performing classical key distribution by the one-time pad method according to the BB84 protocol. Unlike quantum teleportation, if a quantum state is stolen by the eavesdropper, the sender and recipient lose the original quantum information. However, it can be expected that the probability that eavesdroppers will extract quantum information is suppressed low. No consideration is given to safety in a case where an eavesdropper tries to carry out an eavesdropping activity using entanglement.

It is generally thought that classical random string distribution based on quantum mechanics can be satisfactorily done by using only the uncertainty property (A. K. Ekert, "Quantum Cryptography Based on Bell's Theorem", Phys. Rev. Lett. 67, 661 (1991) and C. H. Bennett, G. Brassard, and N. D. Mermin, "Quantum Cryptography without Bell's Theorem", Phys. Rev. Lett. 68, 557 (1992)). It is conceivable that the entanglement property of quantum systems may play an important role in transmission of a quantum state as in quantum teleportation ("Teleporting an unknown quantum state via dual classic and Einstein-Podolsky-Rosen channels", Phys. Rev. Lett. 70, 1895 (1993)). The encryption method proposed here is characterized by having the above two properties.

(First Embodiment)

A quantum state encryption method and apparatus will be described below, which have the following characteristic feature. An input means, storage means, computation means, and output means are prepared for arbitrary quantum information using qubits. In transmitting an arbitrary quantum state from a sender to a recipient through a quantum channel, the first encryption is performed to prevent an eavesdropper from extracting original information even if the quantum state to be transmitted is stolen. A quantum state having signature information is added to guarantee that the quantum state is really transferred from the sender to the recipient. In addition, the second encryption is performed to prevent the eavesdropper from counterfeiting the signature.

A quantum state encryption method and apparatus will be described below, which are characterized by having the following first encryption method. In this method, a set of proper unitary operators to be applied to an n-qubit quantum state is prepared. An operator randomly selected from this set is applied to an arbitrary n-qubit quantum state to be encrypted. This sets the density operators of the quantum state to be transmitted in a statistically mixed state from the viewpoint of the eavesdropper who does not know which operator is applied, thereby preventing the eavesdropper from extracting quantum information.

A quantum state encryption method and apparatus will be described below, which are characterized by having the following first encryption method. In this method, a set of a total of $4^n$ operators constituted by n-fold tensor products of the identity operator Pauli matrices $\{I, \sigma_x, \sigma_y, \sigma_z\}$ to be applied to one qubit is prepared. An operator randomly selected from this set is applied to an arbitrary n-qubit quantum state to be encrypted. This sets the density operator of the quantum state to be transmitted in the identity operator, i.e., n-qubit, statistically perfect mixture of states from the viewpoint of the eavesdropper who does not know which operator is applied, thereby preventing the eavesdropper from extracting quantum information.

A quantum state encryption method and apparatus will be described below, which have the following characteristic feature. A qubit representing the signature of a sender given by a classical binary string is added to each of qubits constituting an n-qubit quantum state subjected to first encryption in order to guarantee that a quantum state is really transferred from the sender to the recipient. In the second encryption method, a set of proper unitary operators to be applied to the n-qubit quantum state having undergone first encryption and the qubit representing the signature is prepared. An operator randomly selected from these operators is applied to the n-qubit quantum state having undergone the first encryption and the qubit representing the signature to prevent the eavesdropper from counterfeiting the qubit representing the signature. The recipient decrypts the received state and observe the qubit representing the signature. That is, this method also serves to perform authentication and detect the intervention of the eavesdropper.

A quantum state encryption method and apparatus will be described below, which have the following characteristic feature. A qubit representing the signature of a sender is added to each of qubits constituting an n-qubit quantum state subjected to first encryption in order to guarantee that a quantum state is really transferred from the sender to the recipient. In the second encryption method, entanglement is caused between qubits of each pair, and an operator randomly selected from $\{I, H, \sigma_x, H\sigma_x\}$ (where H represents Hadamard transformation, $|0\rangle \to (1/\sqrt{2})(|0\rangle+|1\rangle)$, $|1\rangle \to (1/\sqrt{2})(|0\rangle-|1\rangle)$, and $\sigma_x$ represents one of the Pauli matrices, $|0\rangle \to |1\rangle$, $|1\rangle \to |0\rangle$) is applied to each qubit to prevent an eavesdropper from counterfeiting the qubit representing the signature. The recipient decrypts the received state and observes the qubit representing the signature, thereby also performing authentication and detecting the intervention of the eavesdropper.

A quantum state encryption method and apparatus will be described below, which have the following characteristic feature. According to a procedure for cryptographic communication between a sender and a recipient, they use a classical channel through which pieces of classical information (bit strings) are transmitted, the pieces of transmitted information are disclosed to allow an eavesdropper to know them, and the information can be copied but cannot be altered/erased, and a quantum channel through which pieces of quantum information (qubit strings) are transmitted, and an eavesdropper can steal, observe, and alter part or all of the transmitted quantum states but cannot clone an arbitrary quantum state, and perform the following operations: (1) the sender sends an encrypted quantum to the recipient through the quantum channel, (2) upon reception of the quantum state, the recipient disconnects the quantum channel, and notifies the sender of the corresponding information, (3) upon reception of the notification from the recipient, the sender notifies the recipient of which type of operation transformation for the second encryption is through the classical channel, (4) the recipient performs inverse transformation of the second encryption operation notified by the sender with respect to the received quantum state, observes a qubit representing a signature, and notifies the sender of the result through the classical channel, (5) upon reception of the signature from the recipient, the sender authenticates the signature, and if the signature is authenticated, notifies the recipient of which type of operation transformation for the first encryption operation is through the classical channel, or if the signature is not authenticated, determines the intervention of an eavesdropper and ends the communication, and (6) the recipient performs inverse transformation of the first encryption operation with respect to the quantum state on hand to obtain final quantum information.

A quantum state encryption method and apparatus will be described below, which are characterized in that a recipient performs measurement to check the presence/absence of a qubit carrying quantum information on hand to reliably determine that a quantum state is received and disconnect the quantum channel.

The following description is organized as follows. First of all, in [Encryption of Quantum State], a technique of preventing an eavesdropper (Eve) from extracting original quantum information and an authentication method will be described. In [Quantum Encryption Protocol], the overall protocol will be described, and a method of examining whether a recipient (Bob) received a qubit will be discussed, in particular. In [Safety against Eavesdropping], attack methods that can be adopted by the eavesdropper (Eve) will be considered, and safety of encryption for each method will be estimated. Note that complicated mathematical expressions handled in [Safety against Eavesdropping] will be examined in [Maximum Value of $P_B$ When $|\Psi\rangle_Q$ Is A Product State] and [Maximum Value of $P_B$ When $|\Psi\rangle_Q$ Is An Entangled State].

Figure 14:
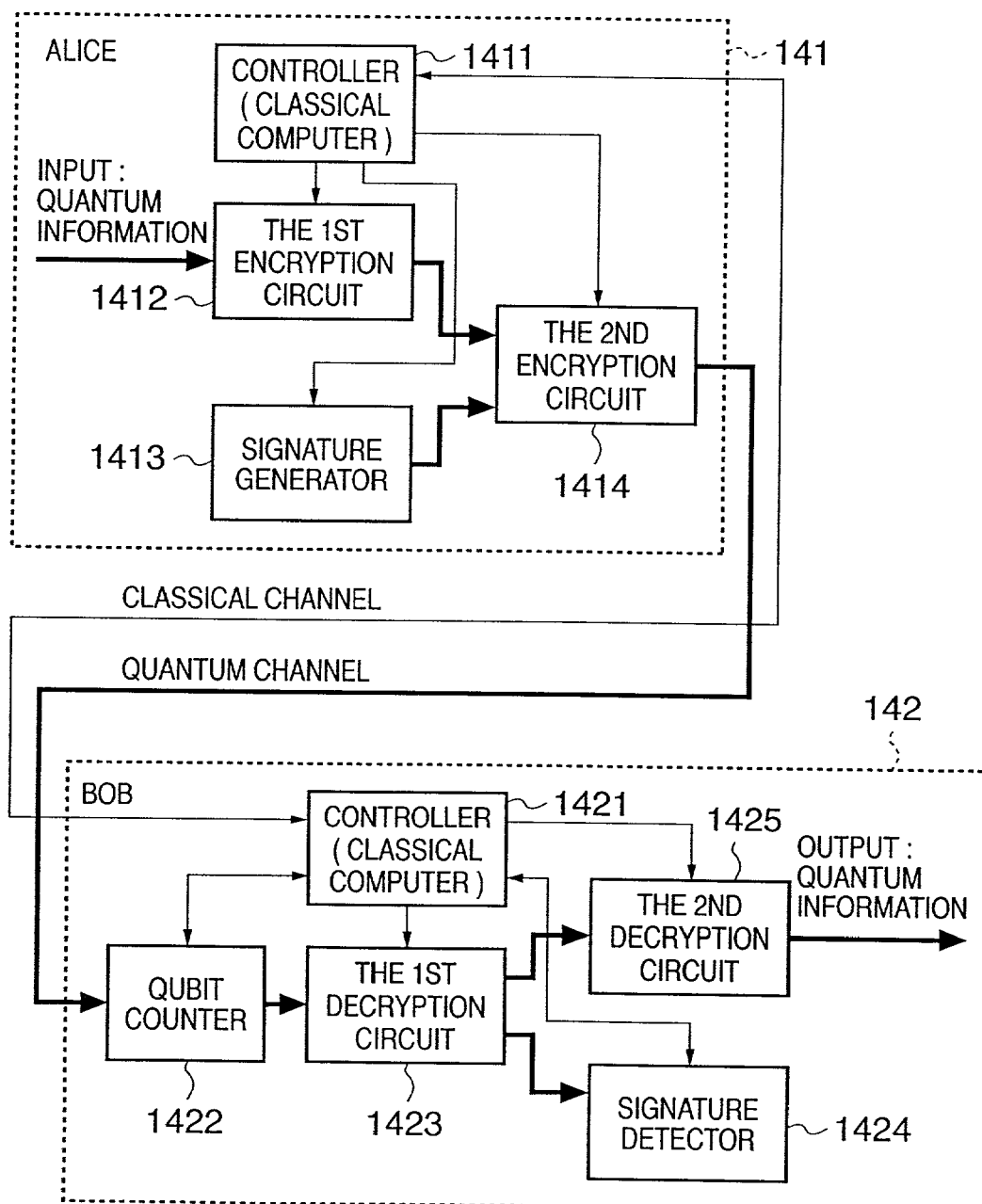
FIG. 14 is a view for explaining the arrangement of an encryption apparatus according to the first and second embodiments.

FIG. 14 is a view showing the arrangement of an encryption apparatus according to the first and second embodiments. Reference numeral 141 denotes an encryption apparatus on the sending side (Alice); and 142, a decryption apparatus on the receiving side (Bob).

Referring to FIG. 14, each thick arrow represents the transfer of a quantum state (quantum information), and each thin arrow represents the transfer of classical information. That is, in FIG. 14, a quantum channel connecting the sending side and receiving side is expressed in thick arrows, and a classical channel connecting the sending side and receiving side is expressed in thin arrows.

The encryption apparatus 141 on the sending side (Alice) will be described first. The first encryption circuit 1412 encrypts an n-qubit to be transmitted. A signature generator 1413 generates a signature to be added to the transmission information. The second encryption circuit 1414 further encrypts the qubit which is encrypted by the first encryption circuit 1412 and to which the signature is added. These devices are controlled by a controller 1411 which is a general, classical computer.

The decryption apparatus 142 on the receiving side (Bob) will be described next. A qubit counter 1422 receives a quantum state sent from Alice and examines whether a qubit is really received. The first decryption circuit 1423 decrypts the received quantum state. A signature detector 1424 detects a signature by observing the contents decrypted by the first decryption circuit 1423. The second decryption circuit 1425 decrypts the portion obtained by subtracting the signature from the contents decrypted by the first decryption circuit 1423. The final n-qubit quantum information is obtained as an output from the first decryption circuit 1423. These devices are controlled by a controller 1421 which is a general, classical computer.

The encryption circuits 1412 and 1414, decryption circuits 1423 and 1425, signature generator 1413, signature detector 1424, and qubit counter 1422 for examining whether a qubit is really received are devices designed to handle quantum states, and hence need to be able to, for example, hold, transform, observe, and initialize qubits. The arrangements of these devices will be described in further detail later in the third and forth embodiments.

Figure 15:
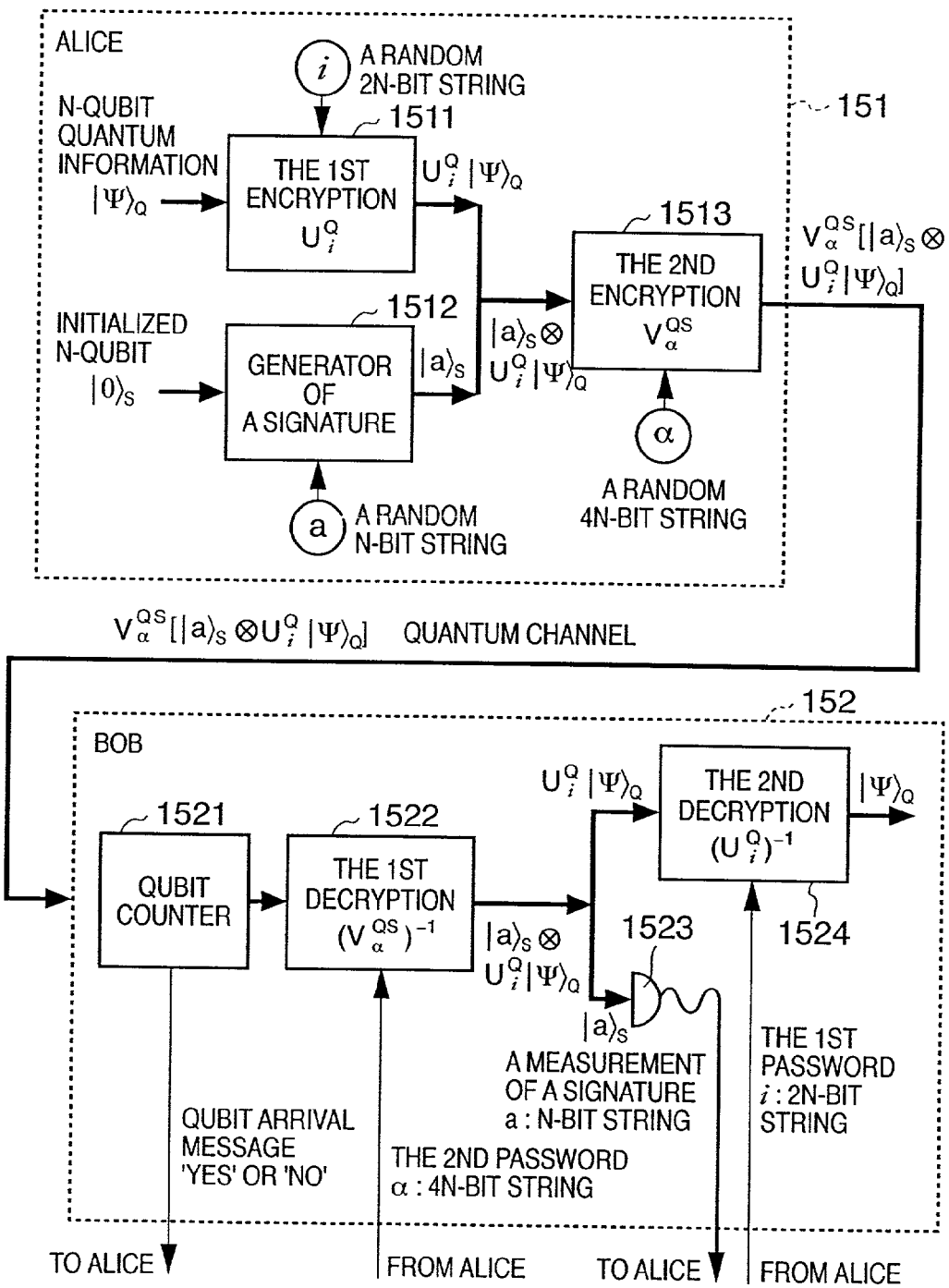
FIG. 15 is a view showing procedures in a quantum state encryption method according to the first embodiment.

FIG. 15 is a view showing procedures in a quantum state encryption method according to the first embodiment. Reference numeral 151 denotes an encryption procedure on the sending side (Alice); and 152, a decryption procedure on the receiving side (Bob).

Referring to FIG. 15, each thick arrow represents the transfer of a quantum state (quantum information), and each thin arrow represents the transfer of classical information. That is, in FIG. 15, a quantum channel connecting the sending side and receiving side is expressed in thick arrows. In addition, each thin arrow externally entering the decryption procedure 152 (from Alice) and extending outward (to Alice) represents the transfer of classical information through a classical channel connecting the sending side and receiving side.

The encryption procedure 151 on the sending side (Alice) will be described first. In the encryption procedure 151, the first encryption processing 1511 ($U_i^Q$) is performed for the n qubits quantum states are ($|\Psi>_Q$) to be transmitted by using a 2n-bit random string i to obtain ($U_i^Q|\Psi>_Q$). In signature generation 1512, n-qubits ($|0>_S$) initialized as ground state is transformed into a quantum system ($|a>_S$) representing a signature by using an n-bit random string a.

Each symbol indicated by the circle in FIG. 15 represents a procedure for generating a random string constituted by classical bits, which can be obtained by using a random number generated by a general, classical computer or a random number table prepared individually on the sending side (Alice) in advance.

The sending side (Alice) couples these two quantum systems ($U_i^Q|\Psi>_Q$) and ($|a>_S$) (couples them as tensor product states; this operation is equivalent to simply placing n qubits having the original quantum information and n qubits representing the signature side by side). The second encryption processing 1513 ($V_\alpha^{QS}$) is performed for this coupled result ($|a>_S \otimes U_i^Q|\Psi>_Q$) by using a 4n-bit random string α. The sending side (Alice) transmits the 2n-qubit state ($V_\alpha^{QS}[|a>_S \otimes U_i^Q|\Psi>_Q]$) obtained by these operations to the receiving side (Bob) through a quantum channel.

The decryption procedure 162 on the receiving side (Bob) will be described next. The receiving side (Bob) performs measurement (a kind of measurement of the number of qubits, which is performed by the qubit counter in FIG. 16) 1621 with respect to the (n+m)-qubit state ($V_\alpha^{QS}[|\alpha>_S \otimes U_i^Q|\Psi>_Q]$) sent from the sending side (Alice) to confirm the arrival of qubits, and notifies the sending side (Alice) that expected 2n qubit was really received. The receiving side then performs first decryption (inverse transformation $(V_\alpha^{QS})^{-1}$) for the second encryption) 1522 by using the second 4n-bit password α received from the sending side (Alice). After the decryption, 2n-qubit $|a>_S \otimes U_i^Q|\Psi>_Q$ is separated into n-qubit state $U_i^Q|\Psi>_Q$ having the original quantum information and m-qubit state $|a>_S$ representing the signature. The receiving side (Bob) performs observation 1523 of the signature qubit ($|a>_S$), and notifies the sending side (Alice) of the result. Finally, the receiving side obtains the original n-qubit quantum information ($|\Psi>_Q$) by performing the second decryption (inverse transformation $(U_i^Q)^{-1}$ for the first encryption) 1524 by using the first 2n-bit password i.

The first and second encryption procedures and the procedures for exchanging information through classical and quantum channels will be described in detail in [Encryption of Quantum State] and [Quantum Encryption Protocol].

[Encryption of Quantum State]

A technique of preventing an eavesdropper (Eve) from extracting original quantum information and a method of performing authentication between a sender (Alice) and a recipient (Bob) will be described.

A method of properly transforming an arbitrary quantum state and preventing Eve from reconstructing the original state will be considered first. For the sake of simplicity, consider, for a while, a case where an arbitrary 1-qubit state is encrypted. This state is represented by a density operator ρ. Assume that ρ represents an arbitrary density operator in a two-dimensional Hilbert space $H_2$ formed by qubits, and Alice has no knowledge about ρ. This is because, even partial observation by Alice will destroy the state.

Alice encrypts ρ by using a classical binary string password to prevent Eve from extracting the original information about ρ even if she steals the qubit. Assume that Alice does not let others know the password. Alice may use the following method. First of all, she prepares the following set of operators:

$$M = \{\sigma_j : j = 0, x, y, z\}$$

where $\sigma_0 = I$ and $\{\sigma_x, \sigma_y, \sigma_z\}$ are Pauli matrices, and they are expressed as $$I = \begin{pmatrix} 1 & 0 \\ 0 & 1 \end{pmatrix}, \sigma_x = \begin{pmatrix} 0 & 1 \\ 1 & 0 \end{pmatrix}, \sigma_y = \begin{pmatrix} 0 & -i \\ i & 0 \end{pmatrix}, \sigma_z = \begin{pmatrix} 1 & 0 \\ 0 & -1 \end{pmatrix}$$

with respect to a bases given by $$|0\rangle = \begin{pmatrix} 1 \\ 0 \end{pmatrix}, \quad |1\rangle = \begin{pmatrix} 0 \\ 1 \end{pmatrix}$$

The operators belonging to the set M may be disclosed. Alice randomly selects one operator $\sigma_i$ from M, and performs unitary transformation represented by $$\rho \to \sigma_i \rho \sigma_i^\dagger$$

Assume that Alice uses the subscript i as a password and does not let others known it. Since there are four types of operators, the password is given by 2-bit classical information.

If, for example, Eve steals the qubit, since Eve does not know what kind of transformation Alice performed, Eve obtains $$\rho' = \frac{1}{4} \sum_{j=0,x,y,z} \sigma_j \rho \sigma_j^\dagger$$

In general, $\rho$ satisfies $\rho^+ = \rho$, Tr$\rho=1$, $0 \leq \lambda_1, \lambda_2 \leq 1$ and $\lambda_1 + \lambda_2 = 1$, where $\lambda_1$ and $\lambda_2$ are the eigenvalues of $\rho$ are $\lambda_1$ and $\lambda_2$. Therefore, arbitrary $\rho$ is given by $$\rho' = \frac{1}{2}(I + a \cdot \sigma),$$

where $a=(a_1, a_2, a_3)$ is a 3-component real vector and $$0 \leq \sum_{k=j}^{3} a_k^2 \leq 1.$$

Since $$\rho' = \frac{1}{2}I + \frac{1}{8} \sum_{j=0,x,y,z} a \cdot \sigma_j \sigma \sigma_j^\dagger \quad (1)$$

and $$\sigma_j \sigma_k \sigma_j = \begin{cases} \sigma_k & j=0 \text{ or } j=k \\ -\sigma_k & j \neq k \text{ and } j, k \in \{x, y, z\} \end{cases}$$

the second term of (1) is canceled out to obtain $$\rho' = \frac{1}{2}I$$

Even if, therefore, Eve obtains $\rho'$, she can extract no information about $\rho$ as long as she does not know the password i.

In general, an arbitrary density operator $\rho_n$ of an n qubits is given by $$\rho_n = \frac{1}{2^2}\left(I + \sum_{k \in \{0,x,y,z\}^n, k \neq (0,\ldots,0)} a_k U_k\right)$$

where $$U_k = \sigma_{k_1} \otimes \cdots \otimes \sigma_{k_n}$$

and $a_k (k \in \{0,x,y,z\}^n$ and $k \neq (0, \ldots, 0))$ are real numbers. In this case, if Alice encrypts $\rho_n$ like $\rho_n \to U_i \rho_n \sigma_i^\dagger$ by using $U_i$ randomly selected from $$M_n = \{U_k : U_k = \sigma_{k_1} \otimes \cdots \otimes \sigma_{k_n}, k \in \{0,x,y,z\}^n\} \quad (2)$$

Eve receives the following state:

$$\rho'_n = \frac{1}{4^n} \sum_{j \in \{0,x,y,z\}^n} U_j \rho_n U_j^\dagger \quad (3)$$

$$= \frac{1}{2^n}I + \frac{1}{4^n \cdot 2^n} \sum_{j,k \in \{0,x,y,z\}^n, k \neq (0,\ldots,0)} a_k U_j U_k U_j^\dagger$$

$$= \frac{1}{2^n}I$$

That is, Eve cannot steal information about $\rho_n$. No matter how Eve performs addition of an auxiliary system, unitary transformation, and observation, she cannot extract $\rho_n$. The password i is given by a 2n-bit string.

An authentication method will be described next. Eve may steal $\rho'_n$ and send a completely arbitrary state $\tilde{\rho}_n$ as a counterfeit to Bob. Even if Bob applies the inverse transformation like $\tilde{\rho}_n \to U_i \tilde{\rho}_n U_i^\dagger$, he does not notice that $\tilde{\rho}_n$ is the counterfeit. This is because, Alice and Bob have no knowledge about the original state $\rho_n$.

A kind of signature is set in $\rho_n$ to allow Bob to confirm that the received data is $\rho_n$ which is really sent from Alice in decoding it. In this case, some kind of technique of preventing Eve from counterfeiting the signature is required. For the sake of simplicity, consider a state $\forall |\Psi\rangle_Q \in H_2^n$ instead of the density operator $\rho_n$. The above discussion holds even if the n-qubit state to be encrypted is a mixed state. Let Q be a system having quantum information, and S be a system representing a signature.

A signature is placed as follows. First of all, Alice prepares an n-bit random string $\forall a=(a_1, \ldots, a_n) \in \{0,1\}^n$ and adds a qubit $|a_k\rangle_S$ to the kth qubit in $$U_i^Q |\Psi\rangle_Q = \sum_{x \in \{0,1\}^n} c_x |x_1\rangle \ldots |x_n\rangle \in H_2^n \quad (4)$$

Figure 2:
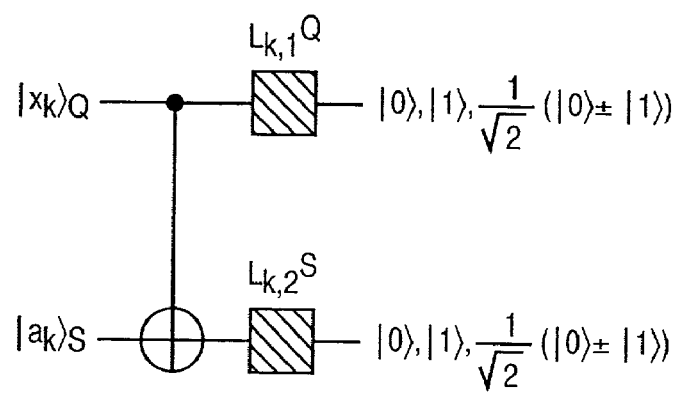
FIG. 2 is a view showing the second encryption performed by Alice, which is used in the first embodiment.

As shown in FIG. 2, a controlled-NOT gate is effected to perform transformation as follows:

$$|x_k\rangle_Q |a_k\rangle_S \to |x_k\rangle_Q |a_k \hat{x} x_k \mod 2\rangle_S \text{ for } k=1, \ldots, n$$

Operators $L_{k,1}^Q$ and $L_{k,2}^S \in L$ randomly selected from $L=\{I, H, \sigma_x, H\sigma_x\}$ are independently applied to two qubits, where, $$H = \frac{1}{\sqrt{2}} \begin{pmatrix} 1 & 1 \\ 1 & -1 \end{pmatrix}$$

Assume that these operations are performed for the k(=1, . . . , n)th qubit, and the overall transformation is written $V_\alpha^{QS}$ where α represents which operator is selected from L. In addition, α is the second password represented by a 4n-bit string.

Figure 3A:
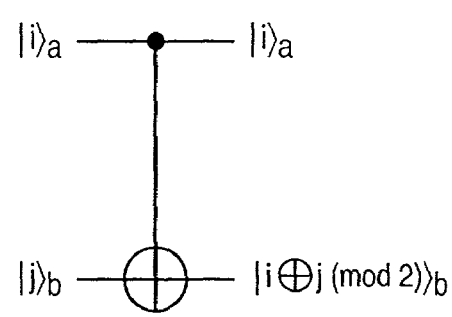
FIGS. 3A and 3B are views showing typical quantum gates used in the first embodiment.
Figure 3B:
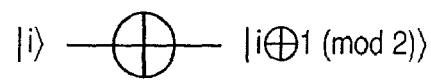

Note that operation for qubits will be often expressed by a network diagram, as shown in FIG. 2. Assume that a qubit is written in lateral line, and operation proceeds from left to right. For example, unitary transformation applied to qubits are expressed as shown in FIGS. 3A and 3B. FIG. 3A shows a controlled-NOT (C-NOT) gate, and FIG. 3B shows $\sigma_x$. These expression methods are based on R. P. Feynman, "Feynman Lectures on Computation", Addison-Wesley (1996) and A. Barenco, C. H. Bennett, R. Cleve, D. P. DiVincenzo, N. Margolus, P. Shor, T. Sleator, J. Smolin, and H. Weinfurter, "Elementary gates for quantum computation", Phys. Rev. A 52, 3457 (1995).

The procedures for encryption described so far will be summarized as follows:

$$|\Psi\rangle_Q \rightarrow U_i^Q|\Psi\rangle_Q (\text{1st password i})$$
$$\rightarrow |a\rangle_S \otimes U_i^Q|\Psi\rangle_Q (\text{signature a})$$
$$\rightarrow V_\alpha^{QS}[|a\rangle_S \otimes U_i^Q|\Psi\rangle_Q] (\text{2nd password } \alpha) \quad (5)$$

If encryption is performed doubly in this manner, Eve cannot steal the state, extract only $|a\rangle_S$, or use it fraudulently. If $V^{\alpha QS}$ is not applied, Eve may steal $U_i^Q|\Psi\rangle_Q$ and send a counterfeit $|a\rangle_S \otimes |\tilde{\Psi}\rangle_Q$ to Bob.

If Eve applies some operation to the kth qubit of the system Q, the signature portion $|a_k\rangle_S$ is destroyed, and Bob cannot properly perform authentication with a certain probability. The same applies to a case where Eve operates the kth qubit of the system S. This is because, the systems Q and S are expressed by two types of bases $\{|0\rangle, |1\rangle\}$ and $\{(1/\sqrt{2})(|0\rangle\pm|1\rangle)\}$, and they are entangled with each other. The probability that the intervention of Eve will be detected by Alice and Bob will be considered in [Safety against Eavesdropping].

[Quantum Encryption Protocol]

Consider a procedure for sending unknown arbitrary quantum data $|\Psi\rangle_Q$ from Alice to Bob by using the encryption method discussed in the preceding item. A problem is set as follows. Assume that Alice wants to send $\forall |\Psi\rangle_Q \in H_2^n$ to Bob without letting Eve eavesdrop it, and Alice and Bob have no knowledge about $|\Psi\rangle_Q$. Assume that each of Alice and Bob can use two types of channels:

Classical Channel

This channel is used to transmit/receive classical information (bit string). The information is disclosed, and Eve can know it. Although the information can be copied, it cannot be altered and erased. This medium is equivalent to the newspaper, radio and so on.

Quantum Channel

This channel is used to transmit/receive quantum information (qubit string). Eve can steal, observe, and alter some or all of a quantum state, but cannot clone an arbitrary quantum state.

Alice and Bob communicate with each other according to the following procedure (see FIG. 1):

1. Alice sends $V_\alpha^{QS}[|a\rangle_S \otimes U_i^Q|\Psi\rangle_Q](\equiv|\Psi_{crypt}\rangle)$ to Bob.

2. Upon reception of the quantum state $|\Psi_{crypt}\rangle$, Bob disconnects the quantum channel and notifies Alice of the corresponding information.

3. Upon reception of the notification from Bob, Alice notifies Bob of which type of transformation (α: 4n-bit) $V_\alpha^{QS}$ is through the classical channel.

4. Bob observes the system S by applying $V_\alpha^{QS\dagger}$ to $|\Psi_{crypt}\rangle$ and notifies Alice of the result (a: n-bit) through the classical channel.

5. Alice receives a signature from Bob and authenticates it. If the signature is correct, Alice notifies Bob of which type of transformation (i: 2n-bit) $U_i^Q$ is through the classical channel. If the signature is not correct, Alice determines that Eve has intervened, and ends the communication.

6. Bob obtains $|\Psi\rangle_Q$ by applying $U_i^{Q\dagger}$ to the quantum state on hand.

Figure 4:
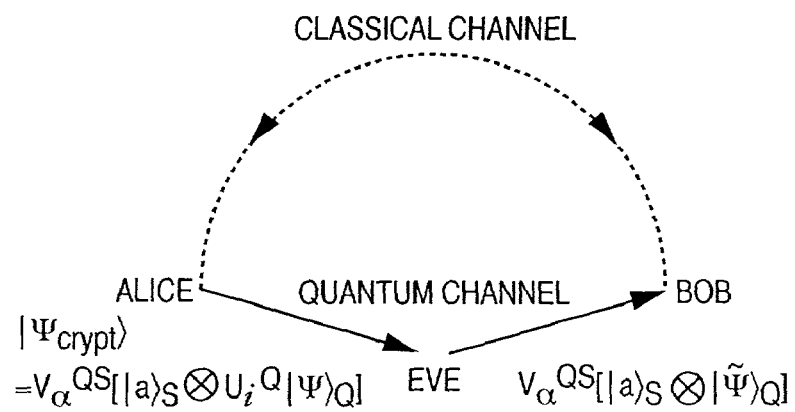
FIG. 4 is a view showing an eavesdropping strategy taken by Eve, which is used in the first embodiment.

In this procedure, the second item is important, in which Bob disconnects the quantum channel upon determining the reception of $|\Psi_{crypt}\rangle$, from the following reason (see FIG. 4). Assume that Bob erroneously notified Alice of the arrival of $|\Psi_{crypt}\rangle$ midway along the quantum channel, and Alice disclosed $V_\alpha^{QS\dagger}$ through the classical channel. The eavesdropper Eve can steal $|\Psi_{crypt}\rangle$ and obtain $|a\rangle_S \otimes U_i^Q|\Psi\rangle_Q$ by applying $V_\alpha^{QS\dagger}$ to $|\Psi_{crypt}\rangle$. Eve can leave $U_i^Q|\Psi\rangle_Q$ on hand and send $V_\alpha^{QS}[|a\rangle_S \otimes U_i^Q|\tilde{\Psi}\rangle_Q]$ obtained by coupling $|a\rangle_S$ to the counterfeit quantum state $|\tilde{\Psi}\rangle_Q$ to Bob. If Bob still holds the quantum channel and receives $V_\alpha^{QS}[|a\rangle_S \otimes U_i^Q|\tilde{\Psi}\rangle_Q]$, since the authentic signature is placed, Alice and Bob cannot detect the presence of Eve. Alice then discloses $U_i^Q$, and Eve obtains $|\Psi\rangle_Q$ at the end.

To avoid such a danger, Bob must determine that he really has received $|\Psi_{crypt}\rangle$ or the quantum state formed by Eve.

Figure 5:
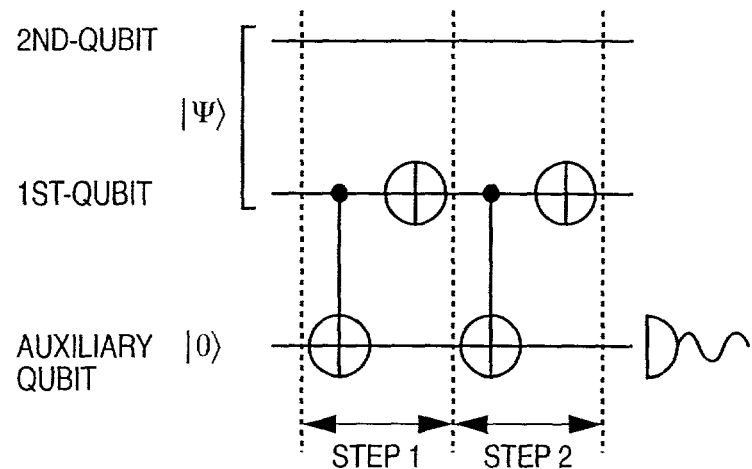
FIG. 5 is a view showing a quantum gate network for counting the number of qubits, which is used in the first embodiment.

For example, the quantum gate network shown in FIG. 5 may be prepared (D. Gottesman, "Stabilizer Codes and Quantum Error Correction", Ph. D. thesis, California Institute of Technology, LANL quantum physics archive quant-ph/9705052). Assume that while the 1st-qubit and 2nd-qubit are in a general entangled state $|\Psi\rangle_Q$, it is to examine the presence/absence of the 1st-qubit by using an auxiliary qubit system A. Assume that the overall system is written $$|\Psi\rangle_Q|0\rangle_A = \sum_{i,j\in\{0,1\}} c_{ij}|i\rangle_2|j\rangle_1|0\rangle_A$$

In this case, $|\Psi\rangle_Q|0\rangle_A$ is transformed into $$|\Psi\rangle_Q|0\rangle_A = \sum_i (c_{i0}|i\rangle_2|0\rangle_1 + c_{i1}|i\rangle_2|1\rangle_1)|0\rangle_A \xrightarrow{\text{step 1}}$$

$$\sum_i (c_{i0}|i\rangle_2|i\rangle_1|0\rangle_A + c_{i1}|i\rangle_2|0\rangle_1|1\rangle_A) \xrightarrow{\text{step 2}}$$

$$\sum_i (c_{i0}|i\rangle_2|0\rangle_1 + c_{i1}|i\rangle_2|1\rangle_1)|1\rangle_A = |\Psi\rangle_Q|1\rangle_A$$

If, therefore, the measurement to examine the presence/absence of a qubit as in FIG. 5 is performed with respect to each channel through which a qubit is transferred to Bob, it can be examined whether all qubits have arrived.

[Safety against Eavesdropping]

It is difficult to assume all eavesdropping methods that Eve can take. In this case, therefore, assume that Eve tries to perform only the Intercept/Resend attack of independently observing each qubit transmitted with a proper basis and sending a substitute qubit in accordance with the result (C. H. Bennett, F. B. Bessette, G. Brassard, L. Salvail and J. Smolin, "Experimental Quantum Cryptography", J. Cryptology, 5: 3–28 (1992)). Consideration should be given to the following. Since a density operator in an encrypted state is kept proportional to I unless Eve knows the password i of first encryption $U_i^Q|\Psi\rangle_Q$, Eve cannot extract information about $|\Psi\rangle_Q$. Eve must therefore let Alice disclose the first password i. Here, the probability that Alice and Bob cannot detect eavesdropping by Eve is estimated.

To simplify the problem, assume, for a while, that $|\Psi\rangle_Q$ is an n-qubit product state. In the first encryption, Alice applies $\forall U_i^Q = \sigma_{i_1} \otimes \cdots \otimes \sigma_{i_n}$ to $|\Psi\rangle_Q = |\Psi_1\rangle \otimes \cdots \otimes |\Psi_n\rangle$. Therefore, $U_i^Q|\psi\rangle_Q$ is also a product state, and each qubit may be considered independently.

Figure 6:
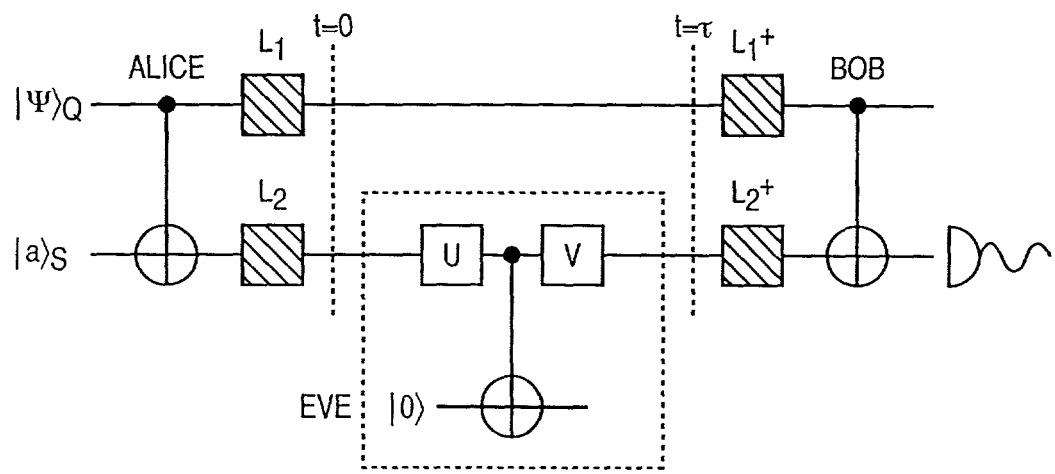
FIG. 6 is a view showing Intercept/Resend attack made by Eve against a system S, which is used in the first embodiment.

Assume that the k(k=1, ..., n)th qubit of $U_i^Q|\psi\rangle_Q$ is written $|\psi\rangle_Q = \alpha|0\rangle_Q + \beta|1\rangle_Q$, and the kth signature qubit is written $|a\rangle_S (a \in \{0,1\})$. The state sent by Alice at time t=0 in FIG. 6 is given by $$\alpha L_1|0\rangle_Q L_2|a\rangle_S + \beta L_1|1\rangle_Q L_2|a\oplus 1\rangle_S$$

At t=τ, Bob observes only the system S. If $|a\rangle_S$ is obtained, Bob determines that proper authentication is done. This means that Bob performs observation with the projection operator given by $$\Pi_{L_1 L_2}^{QS} = (L_1|0\rangle\langle 0|L_1^\dagger)_Q \otimes (L_2|a\rangle\langle a|L_2^\dagger)_S + (L_1|1\rangle\langle 1|L_1^\dagger)_Q \otimes (L_2|a\oplus 1\rangle\langle a\oplus 1|L_2^\dagger)_S$$

Assume that Eve tried to eavesdrop only a qubit of the system S, and the system S. The system S which was in a density operator $\rho^S$ at t=0 evolved into $\$(\rho^S)$ where $\$$ is a completely positive map that describes how Eve made Intercept/Resend attack against the system S (B. Schumacher, "Sending entanglement through noisy quantum channels", Phys. Rev. A54, 2614 (1996)). As a consequence, at t=τ, the state of systems Q and S is given by $$\rho_{L_1 L_2}^{QS} = |\alpha|^2 (L_1|0\rangle\langle 0|L_1')_Q \otimes \$(L_2|a\rangle\langle a|L_2')_s +$$
$$\alpha\beta^* (L_1|0\rangle\langle 1|L_1')_Q \otimes \$(L_2|a\rangle\langle a\oplus 1|L_2')_s +$$
$$\beta\alpha^* (L_1|1\rangle\langle 0|L_1')_Q \otimes \$(L_2|a\oplus 1\rangle\langle a|L_2')_s +$$
$$|\beta|^2 (L_1|1\rangle\langle 1|L_1')_Q \otimes \$(L_2|a\rangle\langle a\oplus 1|L_2')_s$$

The probability P that Bob will obtain $|a\rangle_S$ is given by $$P = Tr_{QS}\left[\rho_{L_1 L_2}^{QS}(\tau)\sum_{L_1 L_2}^{QS}\right]$$
$$= |\alpha|^2 \langle a|L_2'\$(L_2|a\rangle\langle a|L_2')L_2|a\rangle + |\beta|^2\langle a\oplus 1|L_2\$$$
$$(L_2|a\oplus 1\rangle\langle a\oplus 1|L_2')L_2|a\oplus 1\rangle$$

This means that even if the initial state $|\Psi\rangle_Q$ of the system Q is superposition of $|0\rangle$ and $|1\rangle$, it can be regarded as a classical statistical mixture of $|\Psi\rangle_Q = |0\rangle$ and $|\Psi\rangle_Q = |1\rangle$) in obtaining P.

Figure 7:
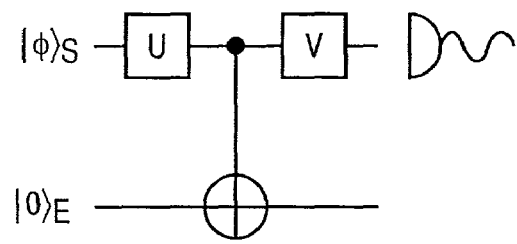
FIG. 7 is a view showing Intercept/Resend attack made by Eve against one qubit, which is used in the first embodiment.

The probability that Bob will successfully perform authentication is equal to the probability that an output will become $|\phi\rangle_S$ with respect to the input $|\phi\rangle_S = L_2|0\rangle_S$ of the system S in a quantum gate circuit like the one shown in FIG. 7. Note that this probability is obtained by averaging all $L_2 \in L$. In the quantum gate network shown in FIG. 7, the probability that Bob will successfully perform authentication is calculated. U and V represent unitary transformation applied to one qubit, and U is defined as $$U|\psi_0\rangle = |0\rangle, \quad U|\psi_1\rangle = |1\rangle$$

with $\{|\psi_0\rangle, |\psi_1\rangle\}$ being the normal orthonormal basis of $H_2$. Assume that $|\phi\rangle = c_0|\psi_0\rangle + c_1|\psi_1\rangle$. Evolution of the state in the network in FIG. 7 can be written as:

$$|\phi\rangle_S|0\rangle_E = (c_0|\varphi_0\rangle_S + c_1|\varphi_1\rangle_S)|0\rangle_E \xrightarrow{U} (c_0|0\rangle_S + c_1|1\rangle_S)|0\rangle_E \xrightarrow{C-NOT} \quad (7)$$
$$c_0|0\rangle_S|0\rangle_E + c_1|1\rangle_S|1\rangle_E \xrightarrow{V} c_0 V|0\rangle_S|0\rangle_E + c_1 V|1\rangle_S|1\rangle_E$$

This operation is equivalent to letting Eve observe an encrypted qubit with a basis $\{|\psi_0\rangle, |\psi_1\rangle\}$ and sending a basis $\{V|0\rangle, V|1\rangle\}$ according to the observation result. The probability that Bob will observe the signature concerning $|\phi\rangle_S$ in spite of the intervention of Eve is given by $$P_\phi = |c_0|^2|\langle\phi|V|0\rangle|^2 + |c_1|^2|\langle\phi|V|1\rangle|^2 \quad (8)$$

For the sake of simplicity, the probability will be expressed by using density operators hereinafter.

$$\rho_\phi = |\phi\rangle\langle\phi|, \tilde{\rho}_0 = |\varphi_0\rangle\langle\varphi_0|, \tilde{\rho}_1 = |\varphi_1\rangle\langle\varphi_1|,$$
$$\tilde{\rho}_0' = V|0\rangle\langle 0|V^\dagger, \tilde{\rho}_1' = V|1\rangle\langle 1|V^\dagger$$

Mathematical expression (7) can be rewritten $$\rho_\phi \to \$(\rho_\phi) = (Tr\rho_\phi\tilde{\rho}_0)\tilde{\rho}_0' + (Tr\rho_\phi\tilde{\rho}_1)\tilde{\rho}_1'$$

Equation (8) can be rewritten $$P_\phi = Tr[\$(\rho_\phi)\rho_\phi]$$

The following four types of density operators $L_2|0\rangle\langle 0|L_2^\dagger$ ($L_2 \in L$) are transmitted as $|\phi\rangle_S$ with equal probability:

$$\rho\uparrow = \frac{1}{2}(I+\sigma_z), \rho\leftrightarrow = \frac{1}{2}(I+\sigma_z), \rho_\nwarrow = \frac{1}{2}(I+\sigma_x),$$
$$\rho_\nearrow = \frac{1}{2}(I+\sigma_x)$$

And we assume $$\tilde{p}_i = \frac{1}{2}[I + (-1)^i X \cdot \sigma], \tilde{p}_j' = \frac{1}{2}[I + (-1)^j X' \cdot \sigma]$$
for $i, j \in \{0, 1\}$ where $X=(X,Y,Z)$ and $X'=(X',Y',Z')$ are 3-component real vectors and satisfy $|X|^2=|X'|^2=1$. With the use of $$Tr(I+A\cdot\sigma)(I+B\cdot\sigma) = 2(1+A\cdot B)$$

a probability $P_B$ that Bob will properly observe a signature in spite of the intervention of Eve is given as follows by averaging four values $P_\phi$.

$$P_B = \frac{1}{4}(P_{\updownarrow} + P_{\leftrightarrow} + P_{\nwarrow\!\!\searrow} + P_{\nearrow\!\!\swarrow}) = \frac{1}{4}(2 + XX' + ZZ') \leq \frac{3}{4} \quad (9)$$

The probability that Alice and Bob will overlook the intervention of Eve using the network in FIG. 7 does not exceed ¾. The same is applied to a case where Eve makes Intercept/Resend attack against the system Q. This means that the probability that Alice and Bob will overlook the presence of Eve is as low as $(3/4)^m$ where m is the number of qubits in which Eve intervened.

Consider a case where Eve makes Intercept/Resend attack against each qubit in the systems Q and S independently. Upon observation of $\rho^{QS}$ sent from Alice, Eve sends a state $\rho^{QS'}$ given below to Bob:

$$\rho^{QS'} = \$(\rho^{QS}) = \sum_{i,j \in \{0,1\}} Tr(\rho^{QS} \tilde{p}_Q, i \tilde{p}_{S,j}) \tilde{p}'_Q, \tilde{p}'_{S,j}$$

where $$\tilde{p}_{Q,i} = U_1^\dagger |i\rangle\langle i| U_1 = (1/2)[I + (-1)^i X_1 \cdot \sigma] \quad (10)$$
$$\tilde{p}_{S,j} = U_2^\dagger |j\rangle\langle j| U_2 = (1/2)[I + (-1)^j X_2 \cdot \sigma]$$
$$\tilde{p}'_{Q,i} = V_1 |i\rangle\langle i| V_1^\dagger = (1/2)[I + (-1)^i X_3 \cdot \sigma]$$
$$\tilde{p}'_{S,j} = V_2 |j\rangle\langle j| V_2^\dagger = (1/2)[I + (-1)^j X_4 \cdot \sigma]$$

and $|X_k|^2 = 1$ (k=1, ..., 4).

Even if $|a\rangle_S$ is $|0\rangle_S$, generality is not lost. Assume also that the state of the system Q to be transmitted is $|\psi\rangle_Q = \alpha|0\rangle + \beta|1\rangle$. Since Alice has 16 ways of applying $L_1$ and $L_2 \in L$, the probability that Bob will make final authentication is given by $$P_B = \frac{1}{16} \sum_{L_1, L_2 \in L} Tr\left[\$(\rho_{L_1,L_2}^{QS}) \prod_{L_1 L_2}^{QS}\right] \quad (11)$$

where $\rho_{L_1,L_2}^{QS}$ is the density operator of the state $\alpha L_1 |0\rangle_Q L_2 |0\rangle_S + \beta L_1 |1\rangle_Q L_2 |1\rangle_S$, which is explicitly written $$\rho_{L_1,L_2}^{QS} = |\alpha|^2 (L_1|0\rangle\langle 0|L_1^\dagger)_Q \otimes (L_2|0\rangle\langle 0|L_2^\dagger)_S + \alpha\beta^* (L_1|0\rangle\langle 1|L_1^\dagger)_Q \otimes (L_2|0\rangle\langle 1|L_2^\dagger)_S + \beta\alpha^* (L_1|1\rangle\langle 0|L_1^\dagger)_Q \otimes (L_2|1\rangle\langle 0|L_2^\dagger)_S + |\beta|^2 (L_1|1\rangle\langle 1|L_1^\dagger)_Q \otimes (L_2|1\rangle\langle 1|L_2^\dagger)_S \quad (12)$$

In addition, $$\Pi_{L_1,L_2}^{QS} = (L_1|0\rangle\langle 0|L_1^\dagger)_Q \otimes (L_2|0\rangle\langle 0|L_2^\dagger)_S + (L_1|1\rangle\langle 1|L_1^\dagger)_Q \otimes (L_2|1\rangle\langle 1|L_2^\dagger)_S$$

Equation (11) is linear for $\rho_{L_1,L_2}^{QS}$. No problem therefore arises even if the respective terms of equation (12) are separately calculated.

First of all, consider the first and fourth terms. Assume that $$l_{L_1,L_2}^{QS} = (L_1|0\rangle\langle 0|L_1^\dagger)_Q \otimes (L_2|0\rangle\langle 0|L_2^\dagger)_S \quad (13)$$

If $L_1 = L_2 = I$, then $$l_{I,I}^{QS} = (1/4)[I + \sigma_z]_Q \otimes [I + \sigma_z]_S$$

$$\Pi_{I,I}^{QS} = (1/4)[(I + \sigma_z)_Q \otimes (I + \sigma_z)_S + (I - \sigma_z)_Q \otimes (I - \sigma_z)_S]$$

Therefore, $$Tr[\$(l_{I,I}^{QS}) \Pi_{I,I}^{QS}] = (1/2)(1 + Z_1 Z_2 Z_3 Z_4)$$

By similar calculation, the following is obtained:

$$Tr\left[\$(l_{L_1,L_2}^{QS}) \prod_{L_1,L_2}^{QS}\right] = \begin{cases} (1/2)(1 + Z_1 Z_2 Z_3 Z_4) & \text{for } L_1, L_2 \in \{I, \sigma_x\} \\ (1/2)(1 + X_1 X_2 X_3 X_4) & \text{for } L_1, L_2 \in \{H, H\sigma_x\} \\ (1/2)(1 + Z_1 X_2 Z_3 X_4) & \text{for } L_1 \in \{I, \sigma_x\} \in \{H, H\sigma_x\} \\ (1/2)(1 + X_1 Z_2 X_3 Z_4) & \text{for } L_1 \in \{H, H\sigma_x\}, L_2 \in \{I, \sigma_x\} \end{cases}$$

Therefore, $$\frac{1}{16} \sum_{L_1, L_2} Tr\left[\$(l_{L_1,L_2}^{QS}) \prod_{L_1,L_2}^{QS}\right] = \frac{1}{2} + \frac{1}{8}(X_1 X_3 + Z_1 Z_3)(X_2 X_4 + Z_2 Z_4)$$

Consider next the second and third terms. Assume that $$\Delta l_{L_1,L_2}^{QS} = (L_1|0\rangle\langle 1|L_1^\dagger)_Q \otimes (L_2|0\rangle\langle 1|L_2^\dagger)_S$$

If, for example, $L_1 = L_2 = I$, then $$\Delta l_{I,I}^{QS} = (1/4)(\sigma_x + i\sigma_y)_Q \otimes (\sigma_x + i\sigma_y)_S$$

$$Tr[\$(\Delta l_{I,I}^{QS}) \Pi_{I,I}^{QS}] = (1/2)(X_1 + iY_1)(X_2 + iY_2) Z_3 Z_4$$

Similarly, $$Tr\left[\$(l_{L_1,L_2}^{QS}) \prod_{L_1,L_2}^{QS}\right] = \begin{cases} (1/2)[X_1 + i \in Y_1][X_2 + i \in Y_2] Z_3 Z_4 (L_1, L_2) = (I, I), & (\sigma_x, \sigma_x) \\ -(1/2)[X_1 + i \in Y_1][X_2 - i \in Y_2] Z_3 Z_4 (I, \sigma_x), & (\sigma_x, I) \\ (1/2)[Z_1 - i \in Y_1][Z_2 - i \in Y_2] X_3 X_4 (H, H), & (H\sigma_x, H\sigma_x) \\ -(1/2)[Z_1 - i \in Y_1][Z_2 + i \in Y_2] X_3 X_4 (H, H\sigma_x), & (H\sigma_x, H) \\ (1/2)[X_1 + i \in Y_1][Z_2 - i \in Y_2] Z_3 X_4 (I, H), & (\sigma_x, H\sigma_x) \\ -(1/2)[X_1 + i \in Y_1][Z_2 + i \in Y_2] Z_3 X_4 (I, H\sigma_x), & (\sigma_x, H) \\ (1/2)[Z_1 - i \in Y_1][X_2 + i \in Y_2] X_3 Z_4 (H, I), & (H\sigma_x, \sigma_x) \\ -(1/2)[Z_1 - i \in Y_1][X_2 - i \in Y_2] X_3 Z_4 (H, \sigma_x), & (H\sigma_x, I) \end{cases}$$

These calculations lead to $$\frac{1}{16}\sum_{L_1,L_2} Tr\left[\$(\Delta l^{QS}_{L_1,L_2})\prod_{L_1,L_2}^{QS}\right] = -\frac{1}{8}Y_1Y_2(Z_3-X_3)(Z_4-X_4) \quad (5)$$

Finally, $$P_B = \frac{1}{2} + \frac{1}{8}(X_1X_3+Z_1Z_3)(X_2X_4+Z_2Z_4) - \frac{1}{8}(\alpha\beta^*+\alpha^*\beta)Y_1Y_2(Z_3-X_3)(Z_4-X_4) \quad (14)$$

The result indicates $P_B \leq 3/4$ (which will be described in the next item [Maximum Value of $P_B$ When $|\Psi\rangle_Q$ Is A Product State]). If, therefore, $|\Psi\rangle_Q$ is an n-qubit product state and Eve makes Intercept/Resend attack against each qubit of the systems Q and S independently, the probability that eavesdropping by Eve will not be found is suppressed to $3/4$ per one qubit.

If the information to be transmitted is classical information, in particular, $|\Psi\rangle_Q$ becomes a product state of $|0\rangle$ and $|1\rangle$, and each of 2n qubits becomes $\{|0\rangle,|1\rangle\}$ or $\{(1/\sqrt{2})(|0\rangle+|1\rangle)\}$. Letting a be an n-bit random key and $|\Psi\rangle_Q$ be an n-bit cipher text, this technique becomes equivalent to BB84 and the one-time pad method. Letting m be the number of qubits on which Eve tries to eavesdrop, the probability of success in eavesdropping is $(3/4)^m$ or less.

Figure 8:
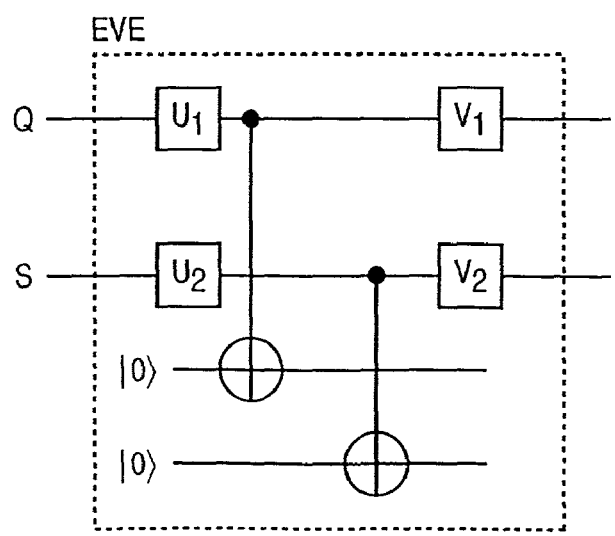
FIG. 8 is a view showing Intercept/Resend attack made by Eve against systems S and Q, which is used in the first embodiment.

Consider next a case where $|\Psi\rangle_Q$ is a general entangled n-qubit state. The state encrypted by $U_i^Q$ is also an entangled state and given by equation (4). Consider first a case where Eve made Intercept/Resend attack on either one kth pair of qubits of the systems Q and S as shown in FIG. 6. Eavesdropping by Eve on m qubit pairs of the systems Q and S becomes substantially equivalent to sending a classical statistical mixed state of $|\Psi\rangle_Q$ in which each qubit is a product state of $|0\rangle$ and $|1\rangle$, as in equation (6). The probability that eavesdropping by Eve will not be found is therefore suppressed to $(3/4)^m$. Assume that Eve eavesdropped on both qubits of m pairs of the systems Q and S, as shown in FIG. 8. In this case as well, the probability that eavesdropping by Eve will not be found is expressed by an equation similar to equation (11), and is suppressed to $(3/4)^m$ (which will be described in the item [Maximum Value of $P_B$ When $|\Psi\rangle_Q$ Is An Entangled State]).

Figure 9A:
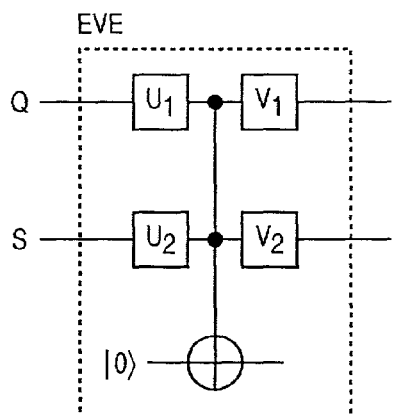
FIGS. 9A and 9B are views showing Intercept/Resend attack made by Eve against the systems Q and S by using entanglement, which are used in the first embodiment.
Figure 9B:
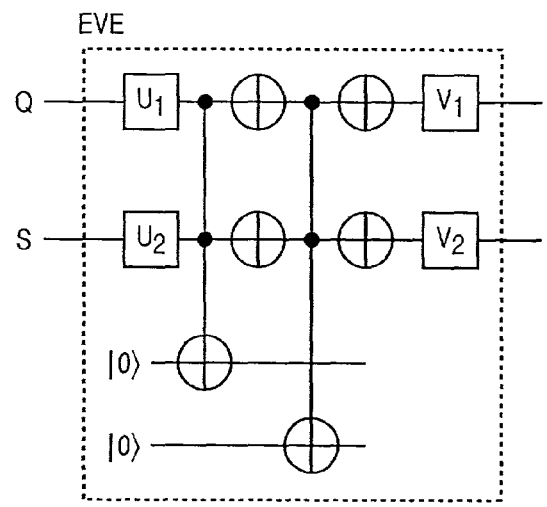

In this case, no consideration is given to the safety of encryption in a case where Eve makes eavesdropping based on entanglement by using a quantum computer. This case corresponds to the case where Eve makes an attack as shown in FIGS. 9A and 9B. Referring to FIGS. 9A and 9B, if $U_1$, $U_2$, $V_1$, and $V_2$ are arbitrary unitary transformations, it is difficult to obtain the upper limit of the probability of authentication by Bob. If, for example, $U_1=U_2=V_1=V_2=U$ where $$U = \begin{pmatrix} \cos(\pi/8) & \sin(\pi/8) \\ \sin(\pi/8) & -\cos(\pi/8) \end{pmatrix}$$

and $|\Psi\rangle_Q$ is classical information, i.e., $|\Psi\rangle_Q$ is in an n-qubit product state of $|0\rangle$ and $|1\rangle$, $P_B=(13/16)>(3/4)$ in FIG. 9A, and $P_B=(11/16)<(3/4)$ in FIG. 9B. Intercept/Resend attack with U is equivalent to observation/transmission of a qubit with the basis given by $$|\varphi_i\rangle\langle\varphi_i| = \frac{1}{2}(I + (-1)^i X \cdot \sigma), \quad X = \left(\frac{1}{\sqrt{2}}, 0, \frac{1}{\sqrt{2}}\right)$$

Such a basis is called a Breidbart basis. Referring to FIG. 9A, although $P_B$ exceeds $3/4$, the information obtained by Eve using this method is considered to be smaller in amount than the information obtained by the Intercept/Resend attack against one qubit as shown in FIG. 6.

[Maximum Value of $P_B$ When $|\Psi\rangle_Q$ Is A Product State]

$P_B$ of equation (14) does not exceed $3/4$ from the following reason.

First of all, $-1 \leq \alpha\beta^*+\alpha^*\beta \leq 1$ from $|\alpha|^2+|\beta|^2=1$. Therefore, by changing a sign like $X_i \rightarrow -X_i$ ($i=1,\ldots,4$), the upper limit of $P_B$ can be expressed as $$P_B \leq \frac{1}{2} + \frac{1}{8} f_{MAX}$$

where $f_{MAX}$ is the maximum value of $$f=(X_1X_3+Z_1Z_3)(X_2X_4+Z_2Z_4)+Y_1Y_2(X_3+Z_3)(X_4+Z_4) \text{ and}$$
$$|X_i|^2=1. X_i,Y_i,Z_i \geq 0 \text{ for } i=1,\ldots,4 \quad (15)$$

Equation (15) indicates the following. First of all, the maximum values of the first and second terms of f are 1 and 2, respectively. If, for example, $$X_1=X_2=(0,1,0), X_3=X_4=(1/\sqrt{2},0,1/\sqrt{2}) \quad (16)$$

then, f=2. As is obvious, therefore, $f_{MAX} \geq 2$. In addition, even if $Y_3=Y_4=0$, the value of $f_{MAX}$ is not influenced.

Here, $f \leq 2$ ($f_{MAX}=2$) will be shown. For this purpose, it is sufficient to indicate the absence of the stationary value of f exceeding 2 by using the Lagrange's method of undetermined multipliers.

If $$F(\{X_i\},\{\lambda_i\}) = f + \sum_{i=1}^{4} \lambda_i(1-|X_i|^2)$$

then, $$\partial F/\partial X_1 = X_3(X_2X_4+Z_2Z_4)-2\lambda_1 X_1=0 \quad (17)$$

$$\partial F/\partial Z_1 = Z_3(X_2X_4+Z_2Z_4)-2\lambda_1 Z_1=0 \quad (18)$$

$$\partial F/\partial X_3 = X_1(X_2X_4+Z_2Z_4)+Y_1Y_2(X_4+Z_4)-2\lambda_3 X_3=0 \quad (19)$$

$$\partial F/\partial Z_3 = Z_1(X_2X_4+Z_2Z_4)+Y_1Y_2(X_4+Z_4)-2\lambda_3 Z_3=0 \quad (20)$$

$$\partial F/\partial Y_1 = Y_3(X_3+Z_3)(X_4+Z_4)-2\lambda_1 Y_1=0 \quad (21)$$

Similar equations can be obtained for $\partial F/\partial X_2=0$, $\partial F/\partial Z_2=0$, $\partial F/\partial X_4=0$, $\partial F/\partial Z_4=0$, and $\partial F/\partial Y_2=0$.

Consider equations (17) and (18). If $X_2X_4+Z_2Z_4=0$, then $f \leq 2$ is obtained from equation (15). Assume that $X_2X_4+Z_2Z_4 \neq 0$. If $\lambda_1=0$, then $X_3=Z_3=0$ and f=0. Hence, assume that $\lambda_1 \neq 0$. Therefore, $$X_3=kX_1, Z_3=kZ_1, k \neq 0 \quad (22)$$

Substitutions of equations (22) into equations (19) and (20) yield $$X_1[(X_2X_4+Z_2Z_4)-2\lambda_3 k]=Z_1[(X_2X_4+Z_2Z_4)-2\lambda_3 k]=-Y_1Y_2(X_4+Z_4)$$

If $(X_2X_4+Z_2Z_4)-2\lambda_3 k=0$, $Y_1Y_2(X_4+Z_4)=0$ and $f \leq 1$. By setting $(X_2X_4+Z_2Z_4)-2\lambda_3 k \neq 0$, $X_1=Z_1$ and $X_2=Z_3$ are obtained. Similarly, $X_2=Z_2$ and $X_4=Z_4$ are obtained. Since $Y_3=Y_4=0$, $$X_3=X_4=(1/\sqrt{2},0,1/\sqrt{2}) \tag{23}$$

A substitution of equation (23) into equation (21) yields $Y_2=\lambda_1 Y_1$. Likewise, from $\partial F/\partial Y_2=0$, $Y_1=\lambda_2 Y_2$ is obtained. Therefore, $Y_2=\lambda_1\lambda_2 Y_2$. If $Y_2=0$, then $f \leq 1$. From this reason, by setting $Y_2 \neq 0$, $\lambda_1\lambda_2=1$ is obtained. A substitution of equation (23) into equation (17) yields $X_2=2\lambda_1 X_1$. Likewise, from $\partial F/\partial X_2=0$, $X_1=2\lambda_2 X_2$ is obtained. Therefore, $X_2=4\lambda_1\lambda_2 X_2$, and $X_2=X_1=0$ is obtained. The result contracts equations (22) and (23).

According to the above description, it is apparent that no stationary value of f exceeds 2, and the maximum value of f is $f_{MAX}=2$.

[Maximum Value of $P_B$ When $|\Psi\rangle_Q$ Is An Entangled State]

The probability that eavesdropping by Eve will not be found when $|\Psi\rangle_Q$ is a general n-qubit entangled state and Eve makes Intercept/Resend attack against m qubit pairs of the systems Q and S will be evaluated.

For the sake of simplicity, consider first a case where $|\Psi\rangle_Q$ is an entangled state of a 2-qubit system qq'.

$$|\Psi\rangle_Q = \sum_{i,j \in \{0,1\}} c_{ij} |i\rangle_q \otimes |j\rangle_{q'} \in \forall H_2^2$$

Alice adds two signature qubit systems S (=ss') to the respective qubit systems Q (=qq'). As shown in FIG. 6, the systems Q and S are entangled by C-NOT, and $L_1$, $L_2$, $L_1'$, $L_2' \in \{L\}$ are applied to four qubits q, s, q', and s', transmitting the resultant information to Bob. As shown in FIG. 8, Eve tries to make Intercept/Resend attack against the systems q, s, q', and s'. Even if the initial values of qubits s and s' as signatures are set to $|0\rangle_S$ and $|0\rangle_{S'}$, no generality is lost.

The state transmitted from Alice is given by $$\sum_{i,j \in \{0,1\}} c_{ij} L_1 |i\rangle_q L_2 |i\rangle_s \otimes L_1' |j\rangle_{q'} L_2' |j\rangle_{s'}$$

This is explicitly written in density operator as follows:

$$\rho_{L_1L_2L_1'L_2'}^{QS} = (L_1L_2L_1'L_2') \sum_{i,j \in \{0,1\}} [|c_{ij}|^2 (|i\rangle\langle i|_q \otimes |i\rangle\langle i|_s) \otimes \tag{24}$$
$$(|j\rangle\langle j|_{q'} \otimes |j\rangle\langle j|_{s'}) +$$
$$c_{ij}c_{\tilde{i}\tilde{j}}^* (|i\rangle\langle \tilde{i}|_q \otimes |i\rangle\langle \tilde{i}|_s) \otimes (|j\rangle\langle \tilde{j}|_{q'} \otimes |j\rangle\langle \tilde{j}|_{s'}) +$$
$$c_{ij}c_{\tilde{i}\tilde{j}}^* (|i\rangle\langle \tilde{i}|_q \otimes |i\rangle\langle \tilde{i}|_s) \otimes (|j\rangle\langle j|_{q'} \otimes |j\rangle\langle j|_{s'}) +$$
$$c_{ij}c_{\tilde{i}\tilde{j}}^* (|i\rangle\langle i|_q |i\rangle\langle \tilde{i}|_s) \otimes (|j\rangle\langle \tilde{j}|_{q'} |j\rangle\langle \tilde{j}|_{s'})]$$
$$(L_1L_2L_1'L_2')^\dagger$$

where $\tilde{i}=i+1 \pmod 2$.

If Eve eavesdrops on the state $\rho_{L_1L_1L_1'L_2}^{QS}$ sent from Alice, it is transformed into $$\$(\rho_{L_1L_2L_1'L_2'}^{QS}) = \sum_{i,j,k,l \in \{0,1\}} Tr(\rho_{L_1L_2L_1'L_2'}^{QS} \tilde{\rho}_{q,i}' \tilde{\rho}_{s,j}' \tilde{\rho}_{q',k}' \tilde{\rho}_{s',l}') \tilde{\rho}_{q,i}' \tilde{\rho}_{s,j}' \tilde{\rho}_{q',k}' \tilde{\rho}_{s',l}'$$

where $$\tilde{\rho}_{q,i}' = (1/2)[I+(-1)^i X_1 \cdot \sigma], \quad \tilde{\rho}_{s,j}' = (1/2)[I+(-1)^j X_2 \cdot \sigma]$$
$$\tilde{\rho}_{q',i}' = (1/2)[I+(-1)^i X_3 \cdot \sigma], \quad \tilde{\rho}_{s',j}' = (1/2)[I+(-1)^j X_4 \cdot \sigma]$$
$$\tilde{\rho}_{q',i}' = (1/2)[I+(-1)^k X_1' \cdot \sigma], \quad \tilde{\rho}_{s',l}' = (1/2)[I+(-1)^l X_2' \cdot \sigma]$$
$$\tilde{\rho}_{q',k}' = (1/2)[I+(-1)^k X_3' \cdot \sigma], \quad \tilde{\rho}_{s',l}' = (1/2)[I+(-1)^l X_4' \cdot \sigma]$$

and, $|X_k|^2=|X_k'|^2=1$ (k=1, ..., 4). Bob performs observation with the following operator:

$$\prod_{L_1L_2L_1'L_2'}^{QS} = (L_1L_2)(|0\rangle\langle 0|_q \otimes |0\rangle\langle 0|_s + |1\rangle\langle 1|_q \otimes$$
$$|1\rangle\langle 1|_s)(L_1L_2)^\dagger \otimes (L_1'L_2')(|0\rangle\langle 0|_{q'} \otimes$$
$$|0\rangle\langle 0|_{s'} + |1\rangle\langle 1|_{q'} \otimes |1\rangle\langle 1|_{s'})(L_1'L_2')^\dagger$$

The probability that Bob will observe the authentic signature is given by $$P_B = \left(\frac{1}{16} \sum_{L_1,L_1' \in L}\right)\left(\frac{1}{16} \sum_{L_1',L_2' \in L}\right) Tr\left[\$(\rho_{L_1L_2L_1'L_2'}^{QS}) \prod_{L_1L_2L_1'L_2'}^{QS}\right]$$
$$= \left[\frac{1}{2}+\frac{1}{8}(X_1X_3+Z_1Z_3)(X_2X_4+Z_2Z_4)\right]\left[\frac{1}{2}+\frac{1}{8}(X_1'X_3'+Z_1'Z_3')\right.$$
$$(X_2'X_4'+Z_2'Z_4')] + \sum_{i,j \in \{0,1\}}\left\{c_{ij}c_{\tilde{i}\tilde{j}}^*\left[\frac{1}{2}+\frac{1}{8}(X_1X_3+Z_1Z_3)\right.\right.$$
$$(X_2X_4+Z_2Z_4)] \times \left[-\frac{1}{8}Y_1'Y_2'(Z_3'-X_3')(Z_4'-X_4')\right] +$$
$$c_{ij}c_{\tilde{i}\tilde{j}}^*\left[-\frac{1}{8}Y_1Y_2(Z_3-X_3)(Z_4-X_4)\right]\left[\frac{1}{2}+\frac{1}{8}(X_1'X_3'+Z_1'Z_3')\right.$$
$$(X_2'X_4'+Z_2'Z_4')] + c_{ij}c_{\tilde{i}\tilde{j}}^*\left[-\frac{1}{8}Y_1Y_2(Z_3-X_3)(Z_4-X_4)\right]$$
$$\left[-\frac{1}{8}Y_1'Y_2'(Z_3'-X_3')(Z_4'-X_4')\right]\Big\}$$

From $\sum_{i,j \in \{0,1\}}|c_{ij}|^2=1$, $\sum_{i,j \in \{0,1\}}c_{ij}c_{\tilde{i}\tilde{j}}^* \leq 1$, $\sum_{i,j \in \{0,1\}}c_{ij}c_{\tilde{i}\tilde{j}} \leq 1$, and $\sum_{i,j \in \{0,1\}}c_{ij}c_{\tilde{i}\tilde{j}}^* \leq 1$ is obtained. Therefore, according to the discussion of [Maximum Value of $P_B$ When $|\Psi\rangle_Q$ Is An Product State], $$P_B \leq \left(\frac{1}{2}+\frac{1}{8}f_{MAX}\right)^2 = \left(\frac{3}{4}\right)^2$$

Obviously, when Eve eavesdrops on m qubits with respect to $|\Psi\rangle_Q$ in the general n-qubit state, the probability can be suppressed to $$P_B \le \left(\frac{1}{2} + \frac{1}{8} f_{MAX}\right)^m = \left(\frac{3}{4}\right)^m$$

(Second Embodiment)

A quantum state encryption method and apparatus will be described below, which have the following characteristic feature. A qubit representing the signature of a sender is added to each of qubits constituting an n-qubit quantum state subjected to first encryption in order to guarantee that a quantum state is really transferred from the sender to the recipient. In the second encryption method, the identity operator or Hadamard transformation H applied to one qubit is randomly applied to each added qubit representing the signature, and n qubits representing quantum information and the qubits representing the signature are randomly permutated to prevent an eavesdropper from counterfeiting the qubits representing the signature. The recipient observes each qubit representing the signature by decrypting the received state, thereby performing both authentication and detection of the intervention of the eavesdropper.

In addition, a quantum state encryption method and apparatus will be described below, which have the following characteristic feature. To detect that an eavesdropper has observed and destroyed part of quantum information to be transmitted, L partial sets of arbitrary qubits are selected from n qubits representing the quantum state to be encrypted, and one auxiliary qubit is added to each partial set so as to make the sum (parity) of the values of qubits included in each partial set become even. These (n+L) qubits are randomly permutated first, and then the first encryption, addition of signature qubits, and second encryption are performed.

Figure 16:
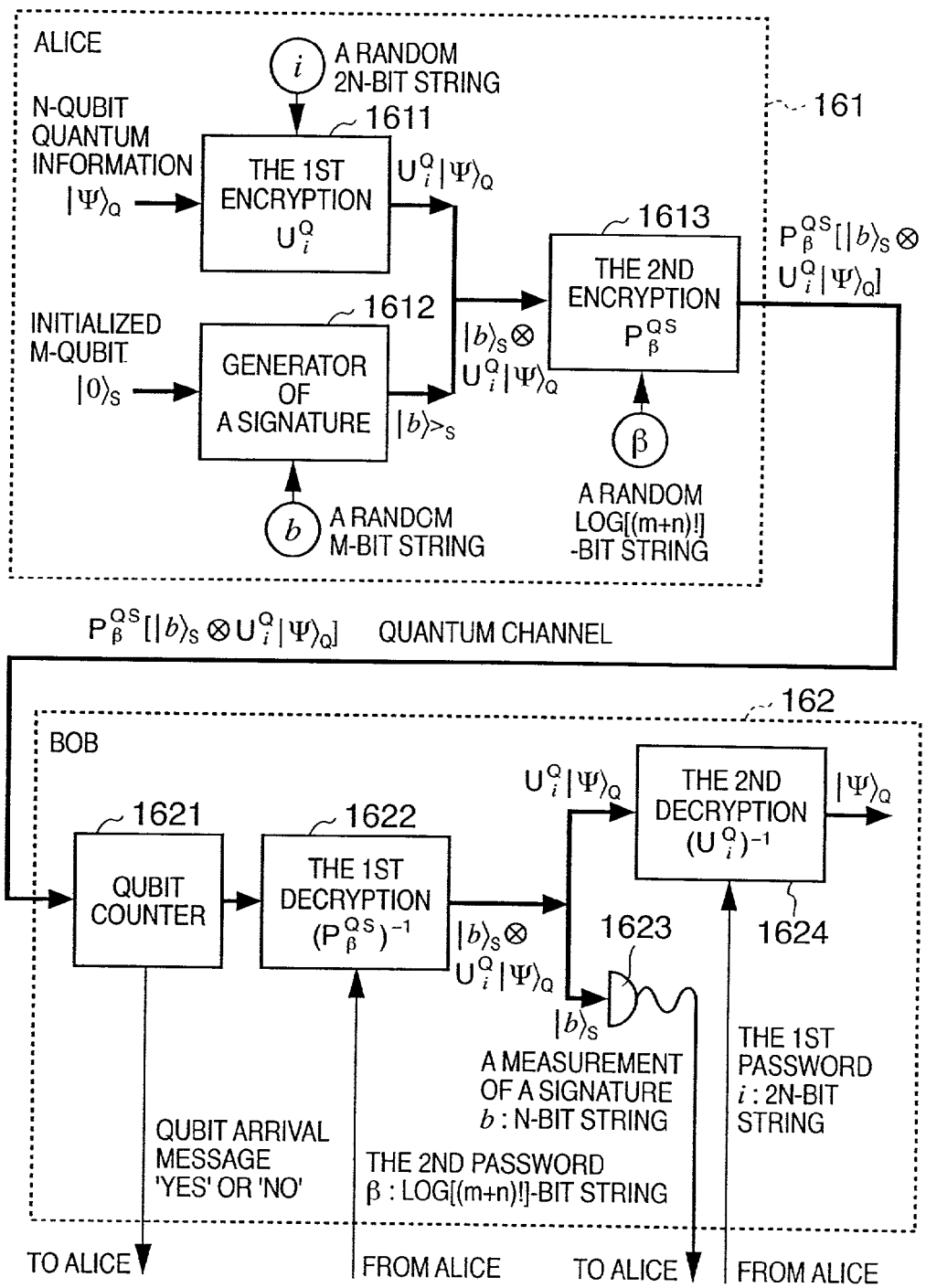
FIG. 16 is a view showing procedures in a quantum state encryption method according to the second embodiment.
Figure 1:
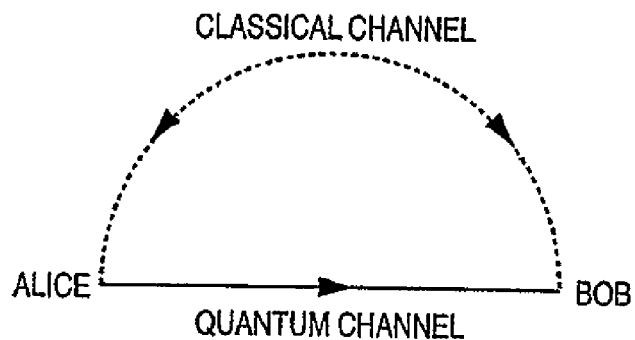
Figure 2:
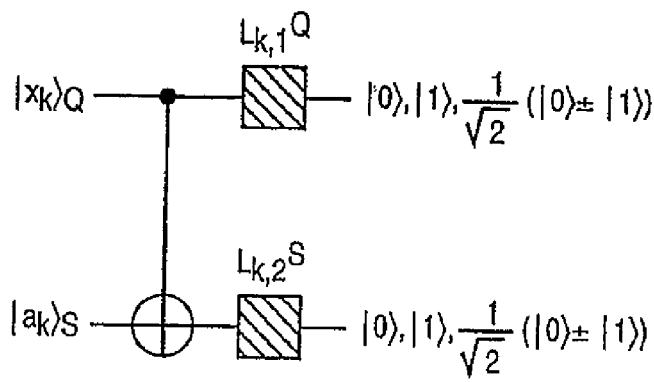
Figure 3A:
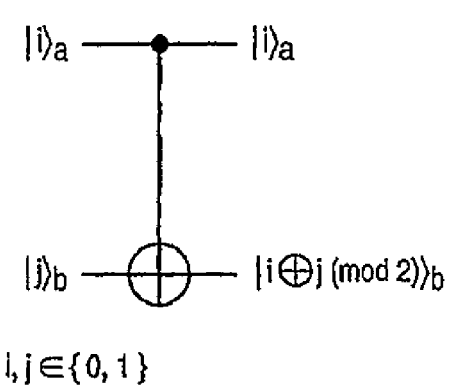
Figure 3B:
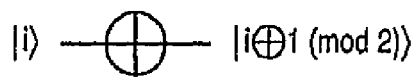
Figure 4:
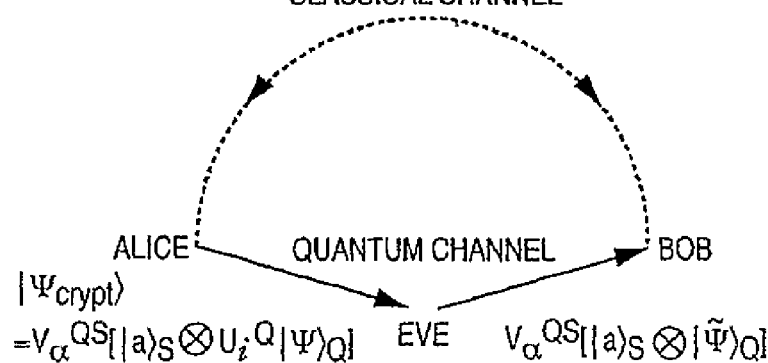

FIG. 16 is a view showing procedures in a quantum state encryption method according to the second embodiment. Reference numeral 161 denotes an encryption procedure on the transmitting side (Alice); and 162, a decryption procedure on the receiving side (Bob). Referring to FIG. 16, as in FIG. 15, each thick arrow represents the transfer of a quantum state (quantum information), and each thin arrow represents the transfer of classical information.

The encryption procedure 161 on the transmitting side (Alice) will be described first. In the encryption procedure 161, the first encryption processing 1611 ($U_i^Q$) is performed for an n-qubit quantum state ($|\Psi>_Q$) to be transmitted by using a 2n-bit random string i to transform it into $U_i^Q|\Psi>_Q$. In signature generation 1612, an m-qubit state ($|0>_S$) initialized as a groud state is transformed into a quantum system ($|b>_S$) representing a signature by using an m-bit random string b.

As in FIG. 15, each symbol indicated by the circle in FIG. 15 represents a procedure for generating a random string constituted by classical bits, which can be obtained by using a random number generated by a general, classical computer or a random number table prepared individually on the sending side (Alice) in advance.

The sending side (Alice) couples these two quantum systems $U_i^Q|\Psi>_Q$ and $|b>_S$ (couples them as tensor product states; this operation is equivalent to simply placing n qubits having the original quantum information and m qubits representing the signature side by side). The second encryption processing 1613 ($P_\beta^{QS}$) is performed for this coupling result ($|b>_S \otimes U_i^Q|\Psi>_Q$) by using a log[(m+n)!]-bit random string β. The sending side (Alice) transmits the (n+m)-qubit state ($P_\alpha^{QS}[|b>_S \otimes U_i^Q|\Psi>_Q]$), obtained by these operations to the receiving side (Bob) through a quantum channel.

The decryption procedure 162 on the receiving side (Bob) will be described next. The receiving side (Bob) performs measurement (a kind of measurement of the number of qubits, which is performed by the qubit counter in FIG. 16) 1621 with respect to the (n+m)-qubit state ($P_\beta^{QS}[|b>_S \otimes U_i^Q|\Psi>_Q]$) sent from the sending side (Alice) to confirm the arrival of qubits, and notifies the sending side (Alice) that the expected 2n qubits were really received. The receiving side then performs the first decryption (inverse transformation $(P_\beta^{QS})^{-1}$ for the second encryption) 1622 by using the second log[(m+n)!]-bit password β received from the sending side (Alice). After the decryption, (n+m)-qubit ($|b>_S \otimes U_i^Q|\Psi>_Q$) is separated into the n-qubit state ($U_i^Q|\Psi>_Q$) having the original quantum information and the m-qubit state ($|b>_S$) representing the signature. The receiving side (Bob) performs observation 1623 of the signature qubit ($|b>_S$), and notifies the sending side (Alice) of the result. Finally, the receiving side obtains the original n-qubit quantum information ($|\Psi>_Q$) by performing the second decryption (inverse transformation $(U_i^Q)^{-1}$ for the first encryption) 1624 by using the first 2n-bit password i.

The first and second encryption procedures and the procedures for exchanging information through classical and quantum channels follow, in practice, the following description of the second embodiment and the above description in [Encryption of Quantum State] and [Quantum Encryption Protocol].

A signature is placed in the following manner. First of all, an m-bit random string $a=(a_1, \ldots, a_m) \in \{0,1\}^m$ is prepared to form a quantum state $|a>_S = |a_1>_S \otimes \cdots \otimes |a_m>_S$ representing an m-qubit signature. One of operators {I,H} is randomly applied to each of m qubits with a probability of ½. The signature obtained in this manner, which represents the m-qubit quantum state, is written $|b>_S = |b_1>_S \otimes \cdots \otimes |b_m>_S$.

The state obtained by adding the signature $|b>_S$ to the quantum data $U_i^Q|\Psi>_Q$ having undergone the first encryption is written $$|b\rangle_S \otimes U_i^Q |\Psi\rangle_Q = \sum_{x \in \{0,1\}} c_x \underbrace{|b_1\rangle \otimes \ldots \otimes |b_m\rangle \otimes |x_1\rangle \otimes \ldots}_{\text{system } S} \otimes \underbrace{|x_x\rangle}_{\text{system } Q}$$

In addition, (m+n) qubits are permutated. An operator for the permutation of qubits is defined as follows. The permutation of (m+n) sequences as β is given by $$\beta = \begin{pmatrix} 1 & 2 & \cdots & m+n \\ \beta_1 & \beta_2 & \cdots & \beta_{m+n} \end{pmatrix}$$

where $\{\beta_1, \ldots, \beta_{m+n}\} = \{1, \ldots, m+n\}$. There are (m+n)! permutations β, and hence log[(m+n)!]-bit information is required to designate β.

Consider transformation $P_\beta^{QS}$ for permutation of each qubit value of (m+n)-qubit information according to β. If, for example, each of $|b>_S$ and $U_i^Q|\Psi>_Q$ is 1-qubit information, and β represents permutation of these qubit values, then $$P_\beta^{QS} \sum_{x \in \{0,1\}} c_x |b\rangle \otimes |x\rangle = \sum_{x \in \{0,1\}} c_x |x\rangle \otimes |b\rangle \text{ for } \beta = \begin{pmatrix} 1 & 2 \\ 2 & 1 \end{pmatrix}$$

Such transformation is unitary, and expressed in 4×4 matrix as follows in practice:

$$\begin{pmatrix} 1 & 0 & 0 & 0 \\ 0 & 0 & 1 & 0 \\ 0 & 1 & 0 & 0 \\ 0 & 0 & 0 & 1 \end{pmatrix} \begin{matrix} |00\rangle \\ |01\rangle \\ |10\rangle \\ |11\rangle \end{matrix}$$
$$\langle 00|\langle 01|\langle 10|\langle 11|$$

Figure 10:
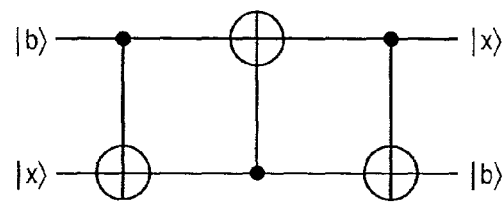
FIG. 10 is a view showing a quantum gate network for 2-qubit permutation, which is used in the second embodiment.

In addition, this transformation can be implemented by the quantum gate network in FIG. 10. The probability that Eve will properly extract a qubit corresponding to the signature portion is $n!/(m+n)!$. Permutation of qubit values seems to use entanglement between the qubits from the viewpoint of the quantum gate network in FIG. 10. However, there is no effect of entanglement as for $P_\beta^{QS}$ as a whole.

The transformation $V_\alpha^{QS}$ in the second encryption described in associated with equation (5) corresponds to application of I or H to each qubit representing the signature and the permutation operation $P_\beta^{QS}$. Therefore, a password for decryption for the second encryption is $(m+\log[(m+n)!])$-bit.

Consider strategies taken by an eavesdropper and safety of encryption. Two strategies that can be taken by Eve will be described in detail below. The first strategy is a method in which Eve observes all qubits that are transmitted with the same basis and sends substitute qubits in accordance with the observation results (Intercept/Resend attack). The second strategy is a method in which Eve extracts some of qubits that are transmitted and sends substitute qubits in a proper state.

Consider the following prior to a description of the first strategy, in which Eve makes Intercept/Resend attack against all qubits with the same basis. In forming $|b\rangle_S$ as a signature qubit, Alice randomly activated Hadamard transformation H to use two types of bases $\{|0\rangle, |1\rangle\}$ and $\{(1/\sqrt{2})(|0\rangle+|1\rangle)\}$. This aims at preventing the following Eve's fraud. Assume that $|b\rangle_S$ is coded by using only $\{|0\rangle, |1\rangle\}$. In this case, Eve may prepare (m+n)-qubit $|0\rangle_E \otimes \cdots \otimes |0\rangle_E$, copy each qubit value by applying a C-NOT gate to each qubit in an encrypted state, and then send the original state to Bob. In this case, m signature qubits are subjected to the following transformation:

$$|b_i\rangle \otimes |0\rangle_E \xrightarrow{C\text{-}NOT} |b_i\rangle \otimes |b_i\rangle \quad b_i \in \{0,1\} \text{ for } i=1, \ldots, m$$

Since the signature portion $|b\rangle_S$ is not entangled with the qubits held by Eve, the signature of Bob is properly observed. In general, however, the quantum data portion is entangled with the qubits held by Eve, and hence the data is destroyed, and the information is partly taken away.

If $|b\rangle_S$ is formed by two types of bases, such danger can be avoided. If, for example, $(1/\sqrt{2})(|0\rangle+|1\rangle)$ is signed as $|b_i\rangle$ and Eve writes it in her own qubit by using the C-NOT gate, then $$\frac{1}{\sqrt{2}}\underbrace{(|0\rangle + |1\rangle)}_{S}\underbrace{|0\rangle}_{E} \xrightarrow{C\text{-}NOT} \frac{1}{\sqrt{2}}(|00\rangle + |11\rangle) \quad (26)$$

$$= \frac{1}{2\sqrt{2}}(|0\rangle + |1\rangle)(|0\rangle + |1\rangle) + \frac{1}{2\sqrt{2}}(|0\rangle - |1\rangle)(|0\rangle - |1\rangle) \quad (27)$$

Alice and Bob therefore notice that the signature is not authentic with a probability of ½. This technique is essentially equivalent to the eavesdropper detection method in BB84.

The above operation will be described further in detail. Eve cannot discriminate which qubits of the (n+m) qubits have quantum information and which qubits represent the signature. Assume that Eve makes Intercept/Resend attack against all the qubits with the same basis. This operation is equivalent to applying the quantum gate network shown in FIG. 7 to all the qubits. As obtained according to equation (9), the probability that Alice and Bob will overlook the intervention of Eve using the network in FIG. 7 does not exceed ¾. This means that if the number of signature qubits is represented by m, the probability that Alice and Bob will overlook the presence of Eve is as low as $(3/4)^m$.

Consider next the second eavesdropping strategy, in which Eve extracts some qubits and sends substitute qubits to Bob. Consider a case where Eve arbitrarily extracts some qubits from the (n+m) qubits and sends substitute qubits to Bob. In this case, if the qubits extracted by Eve represent the signature, since this operation corresponds to the first eavesdropping strategy taken by Eve, which is described above, eavesdropping can be easily detected. A problem arises when all the qubits extracted by Eve represent quantum information. In this case, since the signature qubits are remain intact, Alice and Bob properly authenticate the qubits without noticing eavesdropping. Therefore, the following technique may be used. First of all, the number of signature qubits is set to n, which is equal to that of the information portion, thus forming 2n qubits as a whole. In this case, the probability that Eve will extract $l$ qubits of the quantum information portion alone is given by $$\frac{N}{2N} \cdot \frac{N-1}{2N-1} \cdots \frac{N-(l-1)}{2N-(l-1)} \leq \left(\frac{1}{2}\right)^l$$

This probability is on the same [of the fidelity $F=|\langle\Phi|\psi\rangle|^2$ for $l$ arbitrary qubits ($|\phi\rangle$) and $l$ qubits ($|\psi\rangle$) representing quantum information. This indicates that even if such eavesdropping is performed, the expected value of information amount obtained by Eve is very small.

Figure 11:
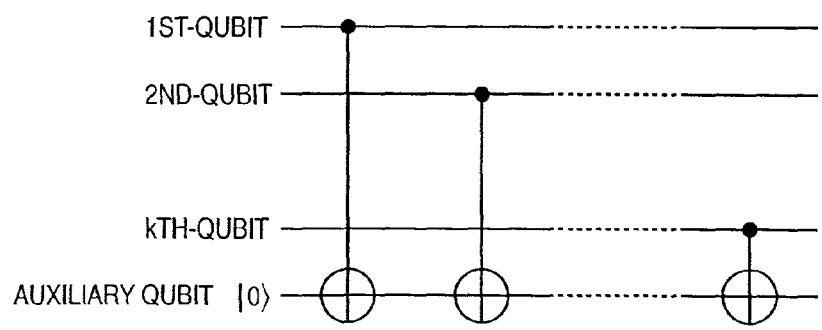
FIG. 11 is a view showing a network that makes a quantum information qubit have parity, which is used in the second embodiment.

In this state, however, Alice and Bob do not notice that Eve has destroyed the quantum information partly. From this reason, the following technique is used. A partial set of arbitrary qubits is selected from the n-qubit information representing the quantum information $|\Psi\rangle_Q$ to be transmitted, and auxiliary qubits are added to the partial set to make the sum (parity) of all qubit values become even. If the number of qubits constituting the partial set is represented by k ($1 \leq k \leq n$), the quantum gate network shown in FIG. 11 may be used to make the parity of (k+1)-qubit information become even as a whole.

L such partial sets are selected, and L auxiliary qubits are added. Permutation is then randomly performed with respect to (n+L)-qubit information. Finally, the resultant data is encrypted by $M_{n+L}$ of equation (2). Decrypting this data, Bob performs inverse transformation to the quantum gate network in FIG. 11 to observe the L auxiliary qubits. If the data is properly transmitted, Bob should observe |0> in all the auxiliary qubits.

If, for example, one of the (n+L) qubits is replaced, about L/2 sets have contradiction for parity. Since Alice, Bob, and Eve do not know the specific states of the (n+L) qubits, the probability that a contradiction will arise in one parity relationship can be regarded to be ½ on average with respect to all of the possible $|\Psi>_Q$. Therefore, both the probabilities that Bob will obtain |0> and |1> by observing the auxiliary qubits is ½. The probability that Bob will overlook the destruction of quantum information by Eve is $(½)^{L/2}$ on average with respect to all of the possible $|\Psi>_Q$.

(Third Embodiment)

In this embodiment, a quantum state encryption method and apparatus will be described below, which are characterized in that photon-counting measurement is performed, as measurement performed to a recipient to examine whether each qubit is really received on the side of the recipient, by using the nonlinear effect produced by introducing two photons into a cavity in which nuclei are injected.

Consider a case where 1-qubit information is expressed by two photon paths (modes x and y). States in which a photon exists and does not exist in each mode are represented by |0> and |1>, respectively. For example, a state in which one photon exists in mode x and no photon exists in mode y is represented by $|1>_x \otimes |0>_y = |10>$. In addition, |01> and |10> are regarded as 1-qubit logic expressions $|\bar{0}>$ and $|\bar{1}>$, respectively. An arbitrary 1-qubit state is given by $$|\psi> = \alpha|01> + \beta|10> = \alpha|\bar{0}> + \beta|\bar{1}> \text{ for } |\alpha|^2 + |\beta|^2 = 1$$

Such a method of forming qubits is called dual-rail representation (I. L. Chuang and Y. Yamamoto, "Simple quantum computer", Phys. Rev. A 52, 3489 (1995)).

Assume that the eavesdropper Eve installed a 50—50 beam splitter midway along a quantum channel and tried to steal a photon. In this case, the photon is in superposition of states where the photon on the side of Bob and the photon on the side of Eve with amplitude of $1/\sqrt{2}$:

$$\frac{1}{\sqrt{2}} |\text{photon on the side of Bob}\rangle + \sqrt{2} : |\text{photon on the side of Eve}\rangle$$

To examine whether a qubit representing $|\psi>$ is on hand, Bob prepares another photon as an auxiliary system, and causes a nonlinear interaction between this photon and the photon passing through two paths representing the qubit. In the optical system shown in FIG. I2C, if a photon exists on the side of Bob, an observation device $D_a$ detects the photon of the auxiliary system. If no photon exists on the side of Bob, an observation device $D_b$ detects the photon of the auxiliary system. If the observation device $D_a$ reacts, the photon is projected to the state where it exists on the side of Bob. If the observation device $D_b$ reacts, the photon shrinks to the state where it exists on the side of Eve.

Figure 12A:
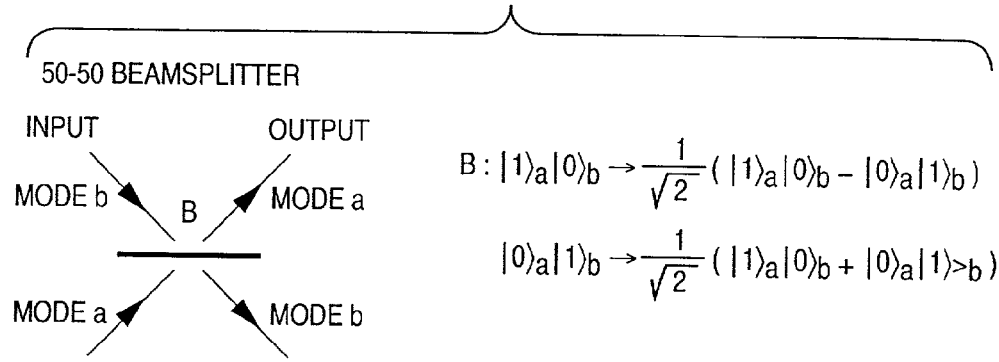
FIGS. 12A to 12C are views showing photon-counting measurement using a nonlinear device, which are used in the third embodiment.
Figure 12B:
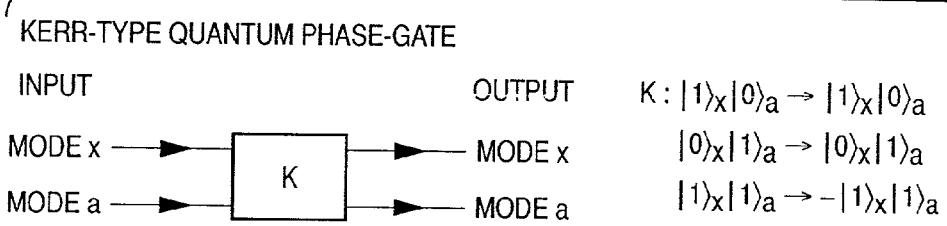
Figure 12C:
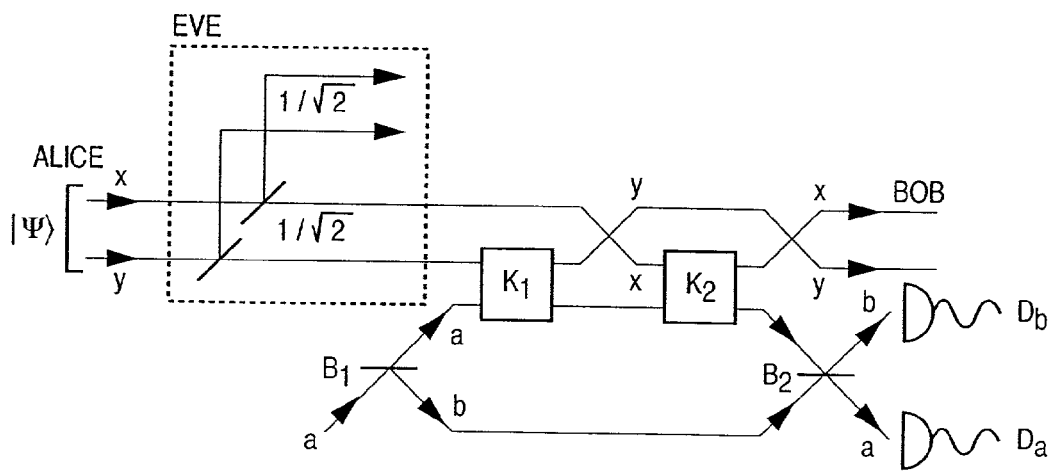

The optical system shown in FIG. 12C uses a beam splitter B for performing SU(2) transformation for the logical expression $\{|\bar{0}>, |\bar{1}>\}$ and an device K for causing Kerr-type interaction between incident photons in FIG. 12B.

The device K causes π rotation of the phase of a wave function only when two photons are incident.

Q. A. Turchette et al. achieved success in an experiment in rotating a phase Δ by 16° by injecting an atom into a cavity surrounded by reflecting mirrors and causing an interaction between the atom and two externally incident photons (Q. A. Turchette, C. J. Hood, W. Lange, H. Mabuchi, and J. Kimble, "Measurement of conditional phase shifts for quantum logic", Phys. Rev. Lett. 75, 4710 (1995)). They noted that the absorption transition of circularly polarized photon σ at a given level of a Cs atom is greatly suppressed as compared with σ+ absorption transition (coupling constant: $g_- = g_+/\sqrt{45}$), and used the phenomenon in which transition is saturated when two σ+ photons enter a cavity:

$$|1^+>_x |1^+>_a \rightarrow e^{i\Delta} |1^+>_x |1^+>_a$$

thus inhibiting phase rotation in other cases.

If Bob performs measurement to check the presence/absence of photons like those shown in FIGS. 12A to 12C with respect to each channel through which a photon is transferred to the side of Bob, he can examine whether all photons have arrived.

(Fourth Embodiment)

In this embodiment, an input means, storage means, computation means, and output means for arbitrary quantum information will be described. In the information processing using qubits in the first and second embodiments as well, these input means, storage means, computation means, and output means for information are commonly used.

This embodiment exemplifies the quantum state encryption method defined in claim 13 and the quantum state encryption apparatus defined in claim 13. More specifically, a quantum state encryption method and apparatus characterized in that polarization of photons, the spins of electrons, nuclei, and the like (including the spins of electrons and nuclei in solids and the spins of nuclei in polymer compounds), and the ground states and excited states of ions are used as qubits will be described.

Any physical system that is a quantum system realizing the Hilbert space based on two orthogonal states as a basis can be implemented as the qubit used in the first and second embodiments. Qubit candidates include the spins of electrons, nuclei and the like (including the spins of electrons and nuclei in solids and the spins of nuclei in polymer compounds), and the ground states and excited states of ions.

Consider, for example, the spin of a nuclei. The Hamiltonian of two nuclear spins in a homogenous static field B is given as follows:

$$H = E_0 - \frac{h}{2}(\gamma_A \sigma_A + \gamma_B \sigma_B) \cdot B + k_{AB} \sigma_A \cdot \sigma_B \quad (28)$$

Figure 13:
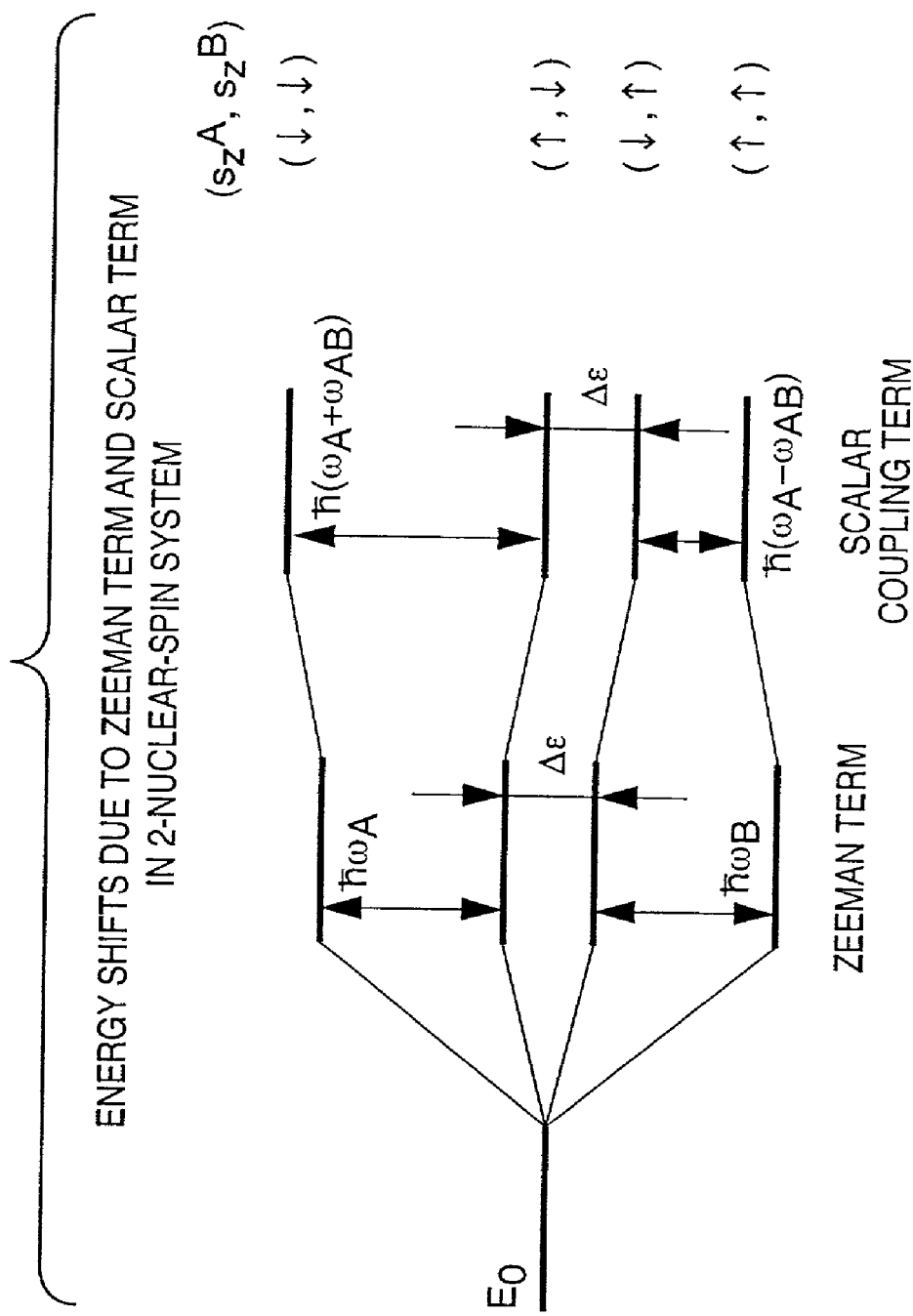
FIG. 13 is a view showing energy shifts due to Zeeman term and scalar coupling term in two nuclear spin systems, which is used in the fourth embodiment.

The second and third terms of equation (28) respectively represent Zeeman term and spin-spin interaction term. Assume that the magnetic field is orientated to the (B=(0, 0,$B_0$)), and the spin-spin interaction is sufficiently smaller than an energy level shift caused by the Zeeman effect ($|k_{AB}| << |(h/2)\gamma_A B_0| \cong |(h/2)\gamma_A B_0|$. Owing to a strong magnetic field in the z direction, as the two spins are aligned in the z direction, the energy is suppressed low. As a consequence, the third term can be approximated to the scalar interaction between z components. The Hamiltonian is given by $$H \cong E_0 - \frac{h}{2}\omega_A \sigma_z^A - \frac{h}{2}\omega_B \sigma_z^B + \frac{h}{2}\omega_A \sigma_z^{AB}$$

where $\omega_A = \gamma_A B_0$, $\omega_B = \gamma_B B_0$, and $(1/2)h\omega_{AB} = k_{AB}$. Assume that $\omega_A$ and $\omega_B$ slightly differ from each other, and the difference is given by $\Delta \epsilon = |\omega_A - \omega_B|$. Energy level shifts are summarized in FIG. 13.

If the downward and upward directions are represented by |1> and |0>, respectively, when spins are diagonalized in the z direction, a nuclear spin system can be regarded as a qubit system. If, therefore, a plurality of nuclear spins are prepared, a plurality of qubits are prepared. If |0↑↑↑↑↑↑↑↑0> is to be input as an initial state to these qubits, a homogeneous static field B=(0,0,B), which is sufficiently strong in the z-axis direction, may be applied to all the nuclear spins. With this operation, all the nuclear spins are aligned in the direction of magnetic field. In this case, therefore, control based on the interaction (Zeeman effect) between an external magnetic field and nuclear spins serves an input means for information.

Once the quantum state of a nuclear spin is confirmed, the state is held at least within the decoherence time. This phenomenon may be regarded as a storage means for information. The above effects described so far in the above embodiments can be applied to the transmission of a nuclear spin as long as a transmission time is within the decoherence time.

The computation means will be described below. All computations for qubit systems are unitary transformations in the Hilbert space in which the qubit systems are formed. An arbitrary unitary transformation for a plurality of qubits can be implemented by combining an arbitrary unitary transformation for one qubit and a C-NOT gate between two qubits. These unitary transformations can be executed by beaming an electromagnetic wave (laser pulse) having a frequency corresponding to an energy slightly shifted from the energy level difference between the states shown in FIG. 13 to nuclear spins. The nuclear spins to which the electromagnetic wave is beamed cause Bloch vibrations between the levels having the energy difference corresponding to the frequency. A transition to a target state can be freely caused by adjusting the intensity and radiation time of a laser pulse. If, for example, an electromagnetic wave having a frequency of $h(\omega_A+\omega_B)+\Delta\epsilon$ is beamed, unitary rotation can be executed between |↓↓> and |↓↑>. By properly combining resonance pulses, "C-NOT" can also be executed. Therefore, the Bloch vibrations caused by the interaction between an external magnetic field and nuclear spins (Zeeman effect) and Block vibration which comes from an energy level shift due to a spin-spin interaction serve as a computation means for information.

To obtain an output from a qubit is to observe the z-axis direction of a nuclear spin. Various methods of observing this have been proposed. The most simple method is a method using a so-called Stern-Gerlach apparatus, often referred to in the introduction of quantum mechanics, which is designed to let a nuclear spin as a beam pass through an inhomogeneous magnetic field ("The Feynman Lectures on Physics, vol. 3", R. P. Feynman, R. B. Leighton, and M. Sands, Addison-Wesley Publishing Company (1965)). Assume that a magnetic field and its gradient are orientated in the z direction, and a nucleon beam is incident in a direction perpendicular to the magnetic field. The nucleon beam is split due to the z-direction component of the spin, and the z-axis direction of the nuclear spin can be observed by detecting this fission. A method of observing electron spins instead of nuclear spins has been proposed (B. E. Kane, "A silicon-based nuclear spin quantum computer", Nature, 393, p. 133–137 (1998)). These techniques can therefore be regarded as output means for information.

The above description is made by taking a nuclear spin as an example. Even if, however, other physical systems are used as qubits, an input means, storage means, computation means, and output means for information can be prepared, and ideas based on physics which are used in such cases have many commonalties with the above description.

In a reference (J. I. Cirac and P. Zoller, "Quantum Computations with Cold Trapped Ions", Phys. Rev. Lett. 74, 4091 (1995)), a method of executing a C-NOT gate by using a method called Cold Trapped Ions is discussed. In this case, n ions are linearly trapped, and the ground state and the first excited state of each ion are regarded as {|0>,|1>} of a qubit. The quantum gate is operated by externally applying a laser beam to each ion.

The linearly trapped ions cause Coulomb interaction, and each ion vibrates around a position of equilibrium. This vibration mode is quantized into a phonon to be used as an auxiliary qubit. In the above reference, a method of executing a C-NOT gate by effectively using this phonon is proposed.

As has been described above, according to the present invention, there are provided a method and apparatus for encrypting an arbitrary quantum state and transmitting it without letting a sender and recipient share an entangled pair of qubits in advance.

As many apparently widely different embodiments of the present invention can be made without departing from the spirit and scope thereof, it is to be understood that the invention is not limited to the specific embodiments thereof except as defined in the claims.

What is claimed is:

1. A computer-implemented encryption method comprising:
    an acquisition step of inputting arbitrary quantum information and acquiring information of a quantum two-state system as a qubit by performing a computation based on a physical system;
    a first encryption step of encrypting the qubit acquired in the acquisition step;
    an adding step of adding to the encrypted qubit a quantum state having signature information for guaranteeing that the qubit is really transferred from a sender to a recipient to produce encrypted and signature-containing qubits;
    a second encryption step of encrypting the encrypted and signature-containing qubits;
    a sending step of sending the quantum state obtained in the second encryption step to the recipient; and
    a measurement step of determining that a quantum state is really received by examining whether a qubit carrying encrypted and signature-containing quantum information is present,
    wherein a sender and a recipient perform cryptographic communication procedures by using a classical channel, through which classical information (bit string) is transmitted, the information that is transmitted is disclosed to allow an eavesdropper to know the information, and the eavesdropper can copy the information but cannot alter or erase the information, and a quantum channel, through which quantum information (qubit string) is transmitted, and the eavesdropper can steal, observe, and alter part of all of a quantum state that is transmitted, but cannot clone an arbitrary quantum state, the quantum state obtained in the second encryption is sent to the recipient through the quantum channel, upon reception of the quantum state, the recipient disconnects the quantum channel and notifies the sender of the corresponding quantum state through the classical channel, upon reception of the notification from the recipient, the sender notifies the recipient of which type of transformation encrypting operation in the second encryption step is through the classical channel, the recipient performs inverse transformation to the operation in the second encryption step notified from the sender, observes a qubit representing a signature, and notifies the sender of the result through the classical channel, the sender receives the signature from the recipient, examines whether the signature is correct, and if the signature is correct, notifies the recipient of which type of transformation the first encrypting operation is through the classical channel, or if the signature is not correct, ends the communication upon determining that an eavesdropper has intervened, and the recipient obtains final quantum information by performing inverse transformation to the first encrypting operation with respect to the received quantum state.

2. The method according to claim 1, wherein in the first encryption step, a set of proper unitary operators to be applied to an n-qubit quantum state is prepared, and an operator randomly selected from the set is applied to an arbitrary n-qubit quantum state to be encrypted, thereby setting density operators of the n-qubit quantum state to be transmitted in a statistically mixed state.

3. The method according to claim 2, wherein in the first encryption step, a set of a total of $4^n$ operators constituted by n-fold tensor products of the identity operator and Pauli matrices $\{I, \sigma_x, \sigma_y, \sigma_z\}$ to be applied to one qubit is prepared, and an operator randomly selected from the set is applied to an arbitrary n-qubit quantum state to be encrypted, thereby setting density operators of the quantum state to be transmitted in a perfect, statistically mixed state.

4. The method according to claim 2, wherein in the addition step, a qubit representing a signature of the sender, which is given by a classical binary string, is added to each qubit constituting the n-qubit quantum state encrypted in the first encryption step in order to guarantee that a qubit is really transferred from the sender to the recipient, and in the second encryption step, a set of unitary operators to be applied to the n-qubit quantum state encrypted in the first encryption step and qubits representing the signature are prepared, and an operator randomly selected from the set is applied to the n-qubit quantum state encrypted in the first encryption step and the qubits representing the signature.

5. The method according to claim 2, wherein in the addition step, a qubit representing a signature of the sender is added to each qubit constituting the n-qubit quantum state encrypted in the first encryption step in order to guarantee that a qubit is really transferred from the sender to the recipient, and in the second encryption step, entanglement is caused between the n-qubit quantum state encrypted in the first encryption step and qubits representing the signature, and an operator randomly selected from (I, H, $\sigma_x$, H$\sigma_x$) (where H represents Hadamard transformation, $|0\rangle \rightarrow (1/\sqrt{2})(|0\rangle+|1\rangle)$, $|1\rangle \rightarrow (1/\sqrt{2})(|0\rangle-|1\rangle)$) and $\sigma_x$ and $_x$ represents one of Pauli matrices, $|0\rangle \rightarrow |1\rangle$, $|1\rangle \rightarrow |0\rangle$) is applied to each qubit.

6. The method according to claim 2, wherein in the addition step, a qubit representing a signature of the sender is added to each qubit constituting the n-qubit quantum state encrypted in the first encryption step in order to guarantee that a quantum state is really transferred from the sender to the recipient, and in the second encryption step, one of the identity operator and Hadamard transformation H to be applied to one qubit is randomly applied to each qubit representing the signature added in the addition step, and n qubits representing the quantum information and the qubits representing the signature are randomly permutated.

7. The method according to claim 4, further comprising the detection step of detecting authentication and intervention of an eavesdropper by observing a qubit representing a signature by decrypting received information on a receiving side.

8. The method according to claim 2, wherein the first encryption step, the addition step, and the second encryption step are executed after L partial sets of arbitrary qubits are selected from n qubits representing an arbitrary quantum state to be encrypted, one auxiliary qubit is added to each partial set so as to make a sum (parity) of values of qubits included in each partial set become even, and the (n+L) qubits are randomly permutated, in order to detect that an eavesdropper has observed and destroyed part of quantum information to be transmitted.

9. The method according to claim 1, wherein in the measurement step, the number of photons is measured by using a nonlinear effect caused when two photons are introduced into a cavity in which a nucleus is injected.

10. The method according to claim 1, wherein one of polarization of a photon, spins of an electron and a nucleus, a spin of a nucleon in a polymer compound, and the ground state and an excited state of an ion is used as the quantum two-state system.

11. An encryption apparatus comprising:

acquisition means for inputting arbitrary quantum information and acquiring information of a quantum two-state system as a qubit by performing a computation based on a physical system;

first encryption means for encrypting the qubit acquired by said acquisition means;

adding means for adding to the encrypted qubit a quantum state having signature information for guaranteeing that the qubit is really transferred from a sender to a recipient to produce encrypted and signature-containing qubits;

second encryption means for encrypting the encrypted and signature-containing qubits;

sending means for sending the quantum state obtained by said second encryption means to the recipient; and measurement means for determining that a quantum state is really received by examining whether a qubit carrying encrypted and signature-containing quantum information is present, wherein a sender and a recipient perform cryptographic communication procedures by using a classical channel, through which classical information (bit string) is transmitted, the information that is transmitted is disclosed to allow an eavesdropper to know the information, and the eavesdropper can copy the information but cannot alter or erase the information, and a quantum channel, through which quantum information (qubit string) is transmitted, and the eavesdropper can steal, observe, and alter part of all of a quantum state that is transmitted, but cannot clone an arbitrary quantum state, the quantum state obtained by the second encryption is sent to the recipient through the quantum channel, upon reception of the quantum state, the recipient disconnects the quantum channel and notifies the sender of the corresponding quantum state through the classical channel, upon reception of the notification from the recipient, the sender notifies the recipient of which type of transformation encrypting operation by the second encryption means is through the classical channel, the recipient performs inverse transformation to the operation in the second encryption means notified from the sender, observes a qubit representing a signature, and notifies the sender of the result through the classical channel, the sender receives the signature from the recipient, examines whether the signature is correct, and if the signature is correct, notifies the recipient of which type of transformation the first encrypting operation is through the classical channel, or if the signature is not correct, ends the communication upon determining that an eavesdropper has intervened, and the recipient obtains final quantum information by performing inverse transformation to the first encrypting operation with respect to the received quantum state.

12. The apparatus according to claim 11, wherein the first encryption means prepares a set of proper unitary operators to be applied to an n-qubit quantum state, and applies an operator randomly selected from the set to an arbitrary n-qubit quantum state to be encrypted, thereby setting density operators of the n-qubit quantum state to be transmitted in a statistically mixed state.

13. The apparatus according to claim 12, wherein the first encryption means prepares a set of a total of $4_n$ operators constituted by n-fold tensor products of the identity operator and Pauli matrices $\{I, \sigma_x, \sigma_y, \sigma_z\}$ to be applied to one qubit, and applies an operator randomly selected from the set to an arbitrary n-qubit quantum state to be encrypted, thereby setting density operators of the quantum state to be transmitted in a perfect, statistically mixed state.

14. The apparatus according to claim 12, wherein said addition means adds a qubit representing a signature of the sender, which is given by a classical binary string, to each qubit constituting the n-qubit quantum state encrypted by the first encryption means in order to guarantee that a qubit is really transferred from the sender to the recipient, and the second encryption means prepares a set of unitary operators to be applied to the n-qubit quantum state encrypted by said the first encryption means and all qubits representing the signature, and applies an operator randomly selected from the set to the n-qubit quantum state encrypted by the first encryption means and the qubits representing the signature.

15. The apparatus according to claim 12, wherein said addition means adds a qubit representing a signature of the sender to each qubit constituting the n-qubit quantum state encrypted by the first encryption means in order to guarantee that a qubit is really transferred from the sender to the recipient, and the second encryption means causes entanglement between the n-qubit quantum state encrypted in the first encryption step and qubits representing the signature, and applies an operator randomly selected from (I, H, $\sigma_x$, H$\sigma_x$) (where H represents Hadamard transformation, $|0\rangle \to (1/\sqrt{2})(|0\rangle+|1\rangle)$, $|1\rangle \to (1/\sqrt{2})(|0\rangle-|1\rangle)$ and $\sigma_x$ and $_x$ represents one of Pauli matrices, $|0\rangle \to |1\rangle$, $|1\rangle \to |0\rangle$) is applied to each qubit.

16. The apparatus according to claim 12, wherein said addition means adds a qubit representing a signature of the sender to each qubit constituting the n-qubit quantum state encrypted by the first encryption means in order to guarantee that a quantum state is really transferred from the sender to the recipient, and the second encryption means randomly applies one of the identity operator and Hadamard transformation H to be applied to one qubit to each qubit representing the signature added by said addition means, and randomly permutates the n qubits representing the quantum information and the qubits representing the signature.

17. The apparatus according to claim 14, further comprising detection means for detecting authentication and intervention of an eavesdropper by observing a qubit representing a signature by decrypting received information on a receiving side.

18. The apparatus according to claim 12, wherein the first encryption means, said addition means, and the second encryption means are executed after L partial sets of arbitrary qubits are selected from n qubits representing an arbitrary quantum state to be encrypted, one auxiliary qubit is added to each partial set so as to make a sum (parity) of values of qubits included in each partial set become even, and the (n+L) qubits are randomly permutated, in order to detect that an eavesdropper has observed and destroyed part of quantum information to be transmitted.

19. The apparatus according to claim 11, wherein said measurement means measures the number of photons by using a nonlinear effect caused when two photons are introduced into a cavity in which a nucleus is injected.

20. The apparatus according to claim 11, wherein one of polarization of a photon, spins of an electron and a nucleus, a spin of a nucleus in a polymer compound, and the ground state and an excited state of an ion is used as the quantum two-state system.

* * * * *

UNITED STATES PATENT AND TRADEMARK OFFICE
CERTIFICATE OF CORRECTION

PATENT NO.        : 7,035,411 B2
APPLICATION NO.   : 09/878218
DATED             : April 25, 2006
INVENTOR(S)       : Hiroo Azuma et al.

It is certified that error appears in the above-identified patent and that said Letters Patent is hereby corrected as shown below:

COVER PAGE AT ITEM [54]:
Title, "ENCRYPTION" should read --QUANTUM ENCRYPTION--.

COVER PAGE AT ITEM [56] RC page 2 line 8:
After "theorem"" delete "m" and replace with --,--.

SHEET NO. 1 of 10:
Figure 1, "COMMUNICATIOON" should read --COMMUNICATION-- as shown on attached page.

SHEET NO. 2 of 10:
Figure 3A, "CONTROOLED" should read --CONTROLLED-- as shown on attached page.

COLUMN 1:
Line 1, "ENCRYPTION" should read --QUANTUM ENCRYPTION--.
Line 27, "theorem for pure quantum states," should read --theorem,--.

COLUMN 2:
Line 63, "observe" should read --observes--.
Line 65, "base." should read --basis.--.

COLUMN 3:
Line 12, "no-cloning" should read --quantum no-cloning--.
Line 23, "no" should read --quantum no- --.

COLUMN 5:
Line 14, "scalar" should read --a scalar--.
Line 38, "dose" should read --does--.

COLUMN 6:
Line 26,"bases" should read --basis--.
Line 43, "bases" should read --basis--.

COLUMN 7:
Line 30, "Pauli" should read --and Pauli--.

COLUMN 10:
Line 18, "qubit was" should read --qubits were--.
Line 19, "first" should read --the first--.
Line 20, "$(V\alpha^{QS})^{-1})$" should read --$(V\alpha^{QS})^{-1}$--.

UNITED STATES PATENT AND TRADEMARK OFFICE
CERTIFICATE OF CORRECTION

PATENT NO. : 7,035,411 B2
APPLICATION NO. : 09/878218
DATED : April 25, 2006
INVENTOR(S) : Hiroo Azuma et al.

It is certified that error appears in the above-identified patent and that said Letters Patent is hereby corrected as shown below:

COLUMN 11:
Line 1, "bases" should read --basis--.
Line 28, "$\rho$ are $\lambda_1$" should read --$\rho$.--.
Line 29, "$\lambda_2$." should be deleted.

COLUMN 12:
Line 1, "an" should be deleted.
Line 17, "$\sigma k_n, \epsilon\{o,x,y,z\}^n\}$" should read --$\sigma k_n, k\epsilon\{o,x,y,z\}^n\}$--.
Line 54, "$|a_{ki}\rangle s$" should read --$|a_k\rangle s$--
Line 64, "$|a_k xxkmod2\rangle_s$" should read --$|a_k xkmod2\rangle_s$--.

COLUMN 13:
Line 15, "transformation" should read --transformations--.
Line 39, "bases" should read --basis--.
Line 58, "radio" should read --the radio,--.

COLUMN 15:
Line 29, "systems, and the" should be deleted.

COLUMN 16:
Line 23, "$P\phi=|c_0|^2|\rangle\phi|V|0\rangle|^2$" should read --$P\phi=|c_0|^2|\langle\phi|V|0\rangle|^2$--.

COLUMN 18:
Line 60, " $Tr|\$(l_{L1,L2}^{QS})$ " should read -- $Tr|\$(\Delta l_{L1,L2}^{QS})$ --.

COLUMN 19:
Line 36, "one" should read --one in--.
Line 40, "statistical" should read --statistically--.

COLUMN 23:
Line 34, "second" should read --the second--.

COLUMN 26:
Line 49, "same [ of" should read --same order of--.
Line 49, "$F=|\rangle\phi|\Psi\rangle|^2$" should read --$F=|\langle\phi|\Psi\rangle|^2$--.

COLUMN 27:
Line 62, "shrinks" should read --is projected--.

UNITED STATES PATENT AND TRADEMARK OFFICE
CERTIFICATE OF CORRECTION

PATENT NO. : 7,035,411 B2
APPLICATION NO. : 09/878218
DATED : April 25, 2006
INVENTOR(S) : Hiroo Azuma et al.

It is certified that error appears in the above-identified patent and that said Letters Patent is hereby corrected as shown below:

COLUMN 28:
Line 19, "check" should read --examine--.

COLUMN 29:
Line 15, "10↕↕↕↕↕↕↕↕↕0>" should read --10↕↕↕0>--.
Line 52, "Block" should read --Bloch--.

COLUMN 31:
Line 1, "of all" should read --or all--.
Line 65, "and $_x$ represents" should read --represents--.

COLUMN 32:
Line 66, "of all" should read --or all--.

COLUMN 33:
Line 33, "$4_n$ operators" should read --$4^n$ operators--.

COLUMN 34:
Line 13, "and $_x$ represents" should read --represents--.
Line 14, "is applied" should be deleted.

Signed and Sealed this

Twentieth Day of February, 2007

JON W. DUDAS
*Director of the United States Patent and Trademark Office*

QUANTUM CRYPTOGRAPHIC COMMUNICATION
BETWEEN ALICE AND BOB $$|\Psi_{crypt}\rangle = V_\alpha^{QS}[|a\rangle_S \otimes U_i^Q |\Psi\rangle_Q]$$

SECOND ENCRYPTION PERFORMED BY ALICE $x_k, a_k \in \{0, 1\}$ $L_{k,1}^Q, L_{k,2}^S \in \{I, H, \sigma_X, H\sigma_X\}$

TYPICAL QUANTUM GATES

CONTROLLED-NOT GATE $i, j \in \{0, 1\}$

TYPICAL QUANTUM GATES

EAVESDROPPING STRATEGY TAKEN BY EVE